United States Patent

Sasanuma et al.

[11] Patent Number: 5,859,933
[45] Date of Patent: *Jan. 12, 1999

[54] IMAGE FORMING APPARATUS

[75] Inventors: Nobuatsu Sasanuma, Yokohama; Yuichi Ikeda, Tokyo, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 728,166

[22] Filed: Oct. 9, 1996

Related U.S. Application Data

[63] Continuation of Ser. No. 329,977, Oct. 27, 1994, abandoned.

[30] Foreign Application Priority Data

Oct. 29, 1973 [JP] Japan ................................. 5-272713
Oct. 29, 1993 [JP] Japan ................................. 5-272714
Dec. 27, 1993 [JP] Japan ................................. 5-331246
Dec. 29, 1993 [JP] Japan ................................. 5-354530

[51] Int. Cl.$^6$ .................................................. G06K 9/00
[52] U.S. Cl. ........................................ 382/275; 382/274
[58] Field of Search ................................. 358/406, 451, 358/504, 518, 528, 502; 395/102, 110; 382/167, 162, 163, 254, 255, 274, 275, 260, 266, 270, 302, 305, 307, 309, 312, 317, 318, 319, 321, 293, 286

[56] References Cited

U.S. PATENT DOCUMENTS

| | | | |
|---|---|---|---|
| 4,176,363 | 11/1979 | Kasahara | 347/19 |
| 4,320,964 | 3/1982 | Ishida et al. | 355/69 |
| 4,888,636 | 12/1989 | Abe | 358/80 |
| 4,977,414 | 12/1990 | Shimada et al. | 346/154 |
| 5,117,308 | 5/1992 | Tsuchida et al. | 359/654 |
| 5,130,935 | 7/1992 | Takiguchi | 364/526 |
| 5,142,356 | 8/1992 | Usami et al. | 358/80 |
| 5,166,786 | 11/1992 | Sakai et al. | 358/76 |
| 5,181,260 | 1/1993 | Kurosu et al. | 382/289 |
| 5,258,783 | 11/1993 | Sasanuma et al. | 346/157 |
| 5,528,339 | 6/1996 | Buhr et al. | 355/32 |
| 5,557,412 | 9/1996 | Saito et al. | 358/296 |
| 5,610,639 | 3/1997 | Tadaka et al. | 347/19 |

*Primary Examiner*—Leo H. Bourdreau
*Assistant Examiner*—Bijan Tadayon
*Attorney, Agent, or Firm*—Fitzpatrick, Cella, Harper & Scinto

[57] ABSTRACT

When a gradation test pattern is read a predetermined period of time after the gradation test pattern was fixed, the correction amount can be controlled based on a stable image density, and an image with good gradation characteristics can be formed. A gradation test pattern including all color patterns is output in accordance with a gradation test pattern registered in a test pattern memory area, and at the same time, a timer is started. After an elapse of a predetermined period of time stored in a RAM, the output gradation test pattern is read by an original reader. On the basis of the read image density, a γ-LUT is set.

28 Claims, 36 Drawing Sheets

FIG. 9

START READING AFTER 20 SEC

IMAGE FORMING APPARATUS

This application is a continuation of Application Ser. No. 08/329,977 filed Oct. 27, 1994, now abandoned.

BACKGROUND OF THE INVENTION

The present invention relates to an image processing apparatus and method having a function of adjusting the image forming condition of image forming means.

Conventionally, as a method of adjusting the image processing characteristics of an image forming apparatus such as a copying machine, a printer, or the like, the following technique is known.

More specifically, in this technique, an image forming apparatus is turned on and a specific gradation test pattern is formed on a recording medium. Thereafter, the density of the gradation test pattern formed on the recording medium is read by image reading means, and correction data based on the read image information is fed back to means for determining an image forming condition such as γ correction means. With this technique, image quality can be stabilized in correspondence with a variation in characteristics due to aging or a variation in environmental condition.

However, in a copying machine, a printer, or the like, the density of an output sample, which has just finished a fixing process is unstable.

For example, immediately after a thermal fixing process, a change in output toner image due to a change in temperature is large, and the physical properties of the toner on the output sample also change. As a result, the surface state of the output sample changes as the temperature of the sample becomes close to room temperature.

Furthermore, as is known, silicone oil is coated on the roller surface so as to prevent a toner image from becoming attached to a fixing roller, i.e., to improve separation characteristics. The silicone oil remains on the surfaces of a support member and a toner layer, and is absorbed in the support member as time elapses. This results in reductions in glossiness, density, and the like, and changes the optical density upon reading a toner image.

In the case of an ink-jet system, since ink dots formed on a recording medium are gradually dried, the optical density of an image changes.

In this manner, although the optical density of a gradation test pattern changes, since correction data is fed back to means for determining an image forming condition such as γ correction means on the basis of the read information, an optimal image cannot be obtained.

On the other hand, in the conventional adjusting method, in an image reader, the amount of light emitted from a lamp used for reading changes as time elapses, and the reading condition changes depending on the degree of contamination of an optical system such as a reflecting mirror, a lens, and the like for focusing light emitted from the lamp.

In this case, the image forming condition is controlled under the changed reading condition, and it becomes difficult to accurately adjust the image processing condition of the image forming apparatus.

Furthermore, in the conventional adjusting method, when a recording medium formed with a gradation pattern (density data) and placed on an original table is to be read, if the recording medium is skewed or shifted, wrong data may be read. When correction data is fed back to the image forming condition based on the wrong data, an optimal image cannot be obtained.

SUMMARY OF THE INVENTION

It is an object of the present invention to solve the above-mentioned problems.

More specifically, it is an object of the present invention to accurately adjust the image forming condition of image forming means.

In order to achieve the above object, according to the present invention, there is disclosed an image processing apparatus comprising: generating means for generating a pattern signal, image forming means for forming an image on a medium in accordance with the pattern signal, counting means for counting a time after an image forming by said image forming means is finished, reading means for reading the image on the medium and generating image data, adjusting means for adjusting an image forming condition of said image forming means based on the image data generated by said reading means, and controlling means for controlling an adjusting operation in accordance with the time counted by said counting means.

It is another object of the present invention to provide an image processing apparatus with high operability.

It is still another object of the present invention to allow adjustment of an image forming condition without being influenced by a change in characteristics of reading means.

In order to achieve the above objects, according to the present invention, there is disclosed an image processing apparatus comprising: reading means for reading an original and generating image data, generating means for generating a pattern signal, image forming means for forming an image on a medium in accordance with the image data or the pattern signal, first adjusting means for adjusting a reading condition of said reading means, and second adjusting means for adjusting an image forming condition of said image forming means based on image data which is obtained by reading the image formed by said image forming means in accordance with the pattern signal, wherein an adjusting by said second adjusting means is performed after an adjusting by said first adjusting means.

It is still another object of the present invention to form a standard image in consideration of a shift of the standard image on an original table upon reading of the standard image by reading means.

In order to achieve the above object, according to the present invention, there is disclosed an image processing apparatus comprising: generating means for generating a pattern signal representing a standard image, image forming means for forming an image on a medium in accordance with the pattern signal, reading means for reading the standard image on the medium and generating image data, and adjusting means for adjusting an image forming condition of said image forming means based on the image data generated by said reading means, wherein a size of the standard image is determined by taking an aberration of the medium in said reading means into account.

Other objects and aspects of the present invention will become apparent from the following description taken in conjunction with the accompanying drawings and the appended claims.

BRIEF DESCRIPTION OF THE DRAWINGS

FIG. 9 is a view showing an example of a display in the second embodiment;

DESCRIPTION OF THE PREFERRED EMBODIMENTS

An embodiment according to the present invention will be described in detail hereinafter with reference to the accompanying drawings.

<First Embodiment>

Figure 1:
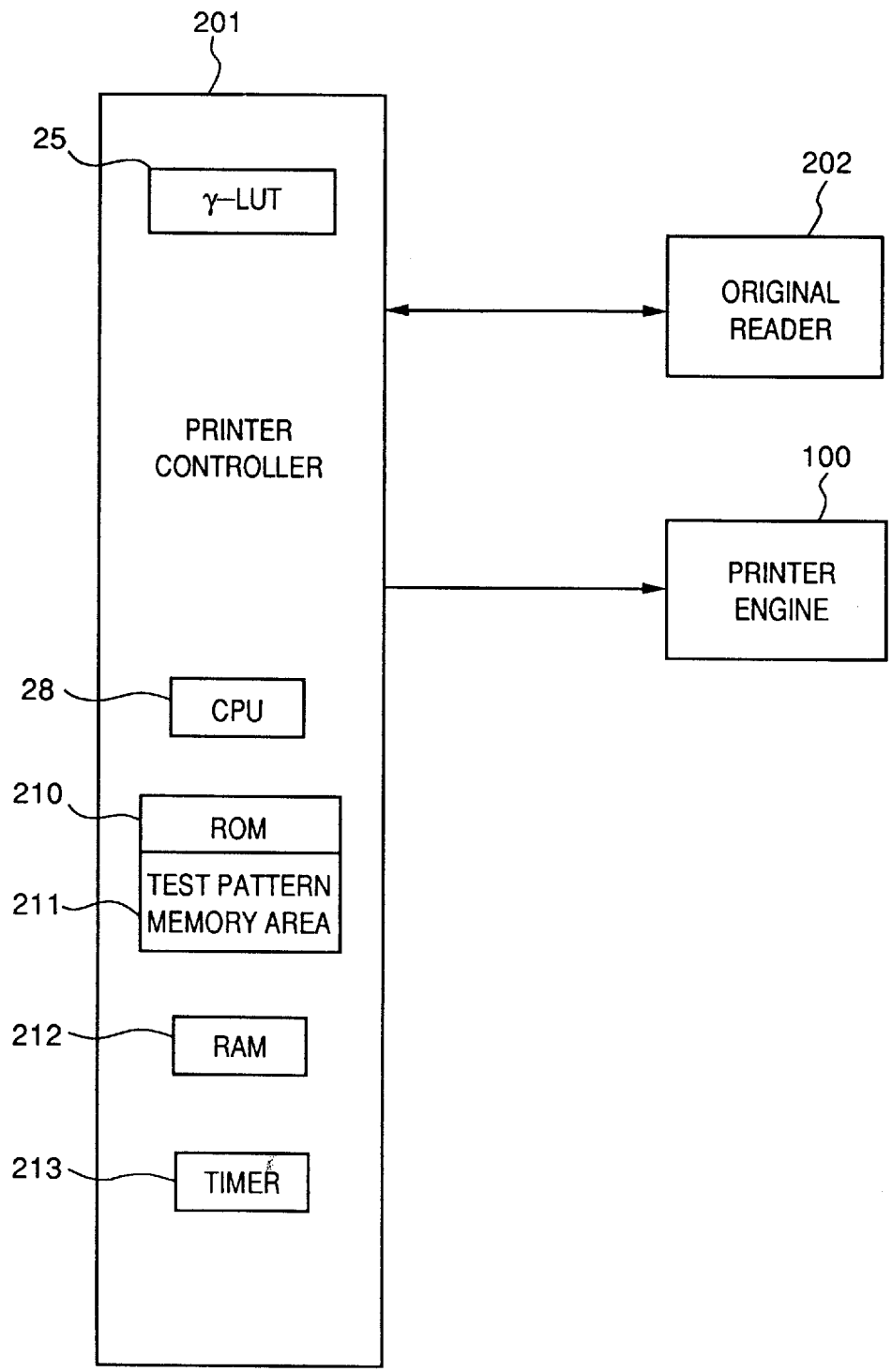
FIG. 1 is a schematic block diagram showing the arrangement of the first embodiment according to the present invention.

FIG. 1 is a schematic block diagram showing the arrangement of a color copying machine of the first embodiment.

Referring to FIG. 1, reference numeral 201 denotes a printer controller for controlling the entire copying machine. The printer controller 201 comprises a CPU 28 such as a microprocessor, a ROM 210 for storing control programs for the CPU 28 and various data, a RAM 212 used as a work area of the CPU 28, and the like. The ROM 210 includes a test pattern memory area 211 which stores a gradation test pattern (to be described later).

Reference numeral 202 denotes an original reader, which comprises a CCD line sensor 21 and the like (to be described later). The original reader 202 reads an original image, processes the read image signal, and outputs the processed signal to the printer controller 201. The printer controller 201 corrects the image signal supplied from the original reader 202 using a look-up table 25 for γ correction (γ-LUT) to convert the image signal into data matching the output characteristics of a printer engine 100, and outputs the converted data to the printer engine 100. Reference numeral 100 denotes a printer engine, which comprises, e.g., a laser beam printer in this embodiment, as shown in FIG. 2.

Reference numeral 213 denotes a timer used in control by the CPU 28; and 25, a correction coefficient table (γ-LUT), which will be described in detail later.

Figure 2:
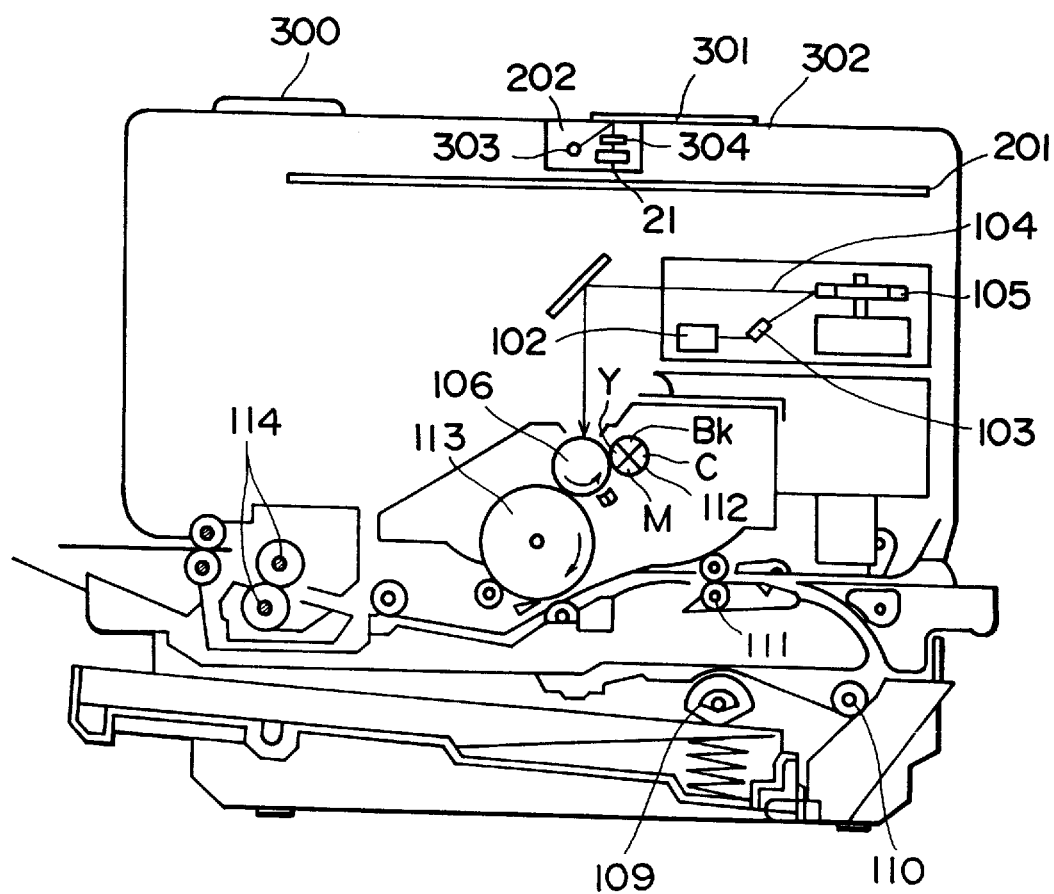
FIG. 2 is a sectional view showing the mechanical arrangement of the first embodiment.

FIG. 2 is a schematic sectional view showing the arrangement of the printer engine 100 shown in FIG. 1. The printer engine 100 of this embodiment will be described below with reference to FIG. 2.

The printer engine 100 of this embodiment shown in FIG. 1 forms an image on a recording sheet on the basis of an image signal read by the original reader 202.

Referring to FIG. 2, reference numerals 201 and 202 respectively denote the printer controller and the original reader shown in FIG. 1. The original reader 202 comprises a light source 303, a color-separation optical system 304, a CCD line sensor 21, and the like. The original reader 202 scans and reads an image on an original 301 to be read, which is placed on an original table glass, and converts the read image signal into R (red), G (green), and B (blue) color-component signals. The printer controller 201 converts the image signal read by the original reader 202 into a signal for driving a semiconductor laser (laser diode) 103, and outputs the converted signal to a laser driver 102.

The laser driver 102 is a circuit for driving the semiconductor laser 103, and turns on/off the semiconductor laser in correspondence with the input image signal. A laser beam 104 is deflected in the right-and-left (main-scanning) direction by a rotary polygonal mirror 105 and scans the surface of a photosensitive drum 106. The photosensitive drum 106 on which a latent image is formed upon scanning the laser beam is rotated in the direction of an arrow in FIG. 2. Upon rotation of the drum 106, the latent image is developed in units of colors by a rotary developer 112 (FIG. 2 illustrates a developing state using a yellow toner).

On the other hand, a recording sheet is wound around a transfer drum 113, and four color toner images, which are developed by the rotary developer 112 in the order of Y (yellow), M (magenta), C (cyan), and Bk (black), are transferred onto the recording sheet by a total of four revolutions of the transfer drum 113, thus ending color recording. Upon completion of the color transfer, the recording sheet is separated from the transfer drum 113, and the color image on the recording sheet is fixed by a pair of fixing rollers 114, thus completing a color image print.

A cut sheet is used as the recording sheet, and cut recording sheets are stored in a paper cassette attached to the printer 100. Each recording sheet is fed into the apparatus by a pick-up roller 109 and feed rollers 110 and 111, and is supplied to the photosensitive drum 106.

Reference numeral 300 denotes an operation panel on which various switches and LED indicators for operations are arranged.

Figure 3:
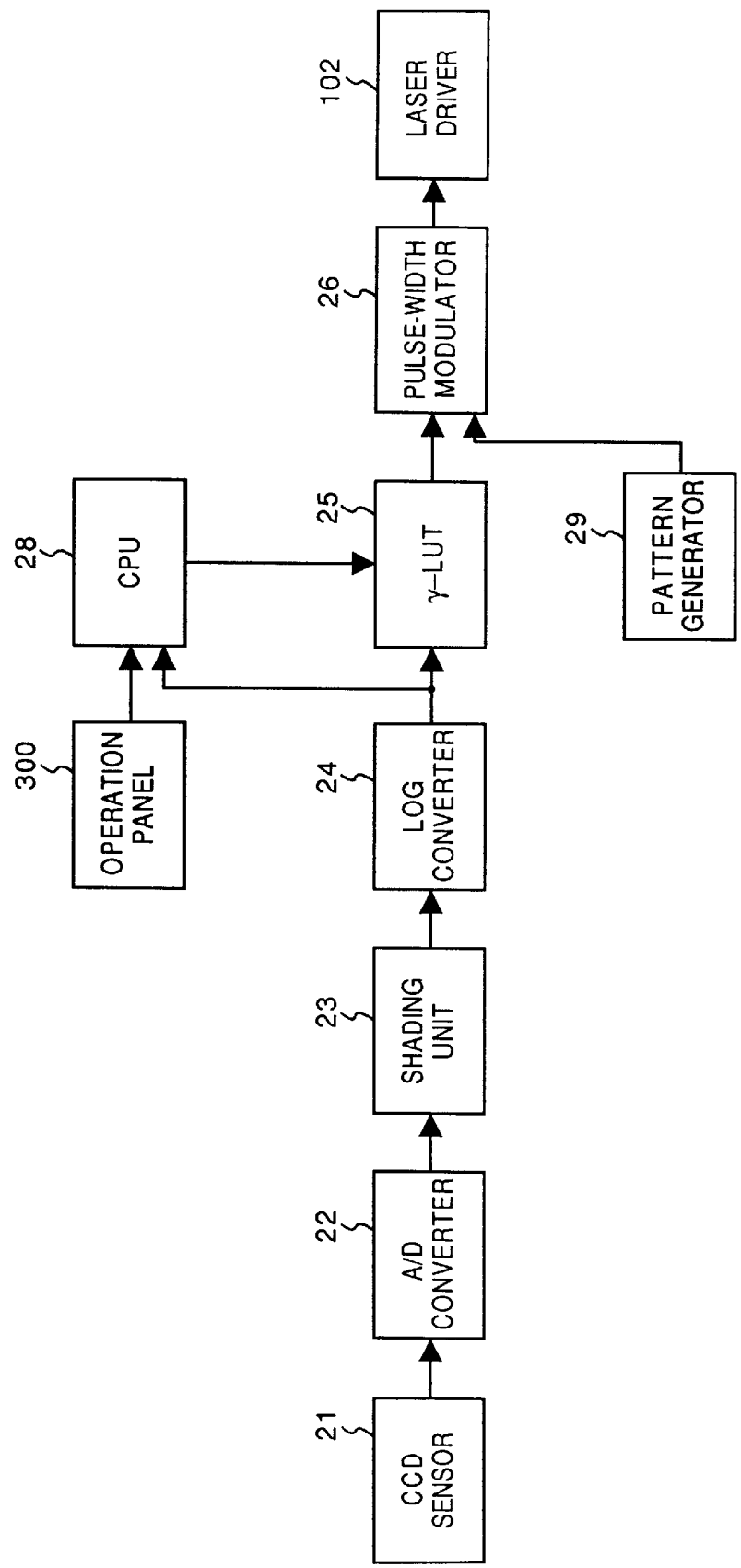
FIG. 3 is a detailed block diagram showing the arrangement of an image processing unit of the first embodiment.

FIG. 3 is a block diagram showing the arrangement of an image signal processing unit for obtaining a gradation image, which unit is arranged in the printer controller 201 in the copying machine of this embodiment.

The arrangement of the image signal processing unit shown in FIG. 3 will be described below.

A luminance signal of an original image read by the CCD line sensor in the reader 202 is input to an A/D converter 22, and is converted into a digital luminance signal. The digital luminance signal is supplied to a shading unit 23, and light amount nonuniformity caused by a sensitivity variation of elements in the CCD line sensor 21 is shading-corrected. As a result of shading correction, the color reproducibility of the CCD line sensor 21 can be improved. The luminance signal corrected by the shading unit 23 is LOG-converted by a LOG converter 24. The LOG-converted signal is supplied to the gamma look-up table (γ-LUT) 25, and the image signal is converted using the γ-LUT 25, so that the original image density in the initial state of the printer engine 100 coincides with the output image density processed in correspondence with the γ characteristics. The γ-LUT 25 is generated by the CPU 28 for each printer by processing (to be described later).

The converted image signal is pulse-width modulated by a pulse-width modulator 26, and the modulated signal is input to the laser driver 102, thereby driving the semiconductor laser 103 shown in FIG. 2. Reference numeral 29 denotes a pattern generator for generating various gradation test patterns (to be described later).

In this embodiment, an electrostatic latent image having gradation characteristics based on a change in dot area is formed on the photosensitive drum 106 upon scanning of a laser beam using gradation reproduction means based on pulse-width conversion processing with which pixels of all Y, M, C, and Bk colors are aligned in the sub-scanning direction, and a gradation image is obtained on a recording sheet via developing, transfer, and fixing processes.

Figure 4:
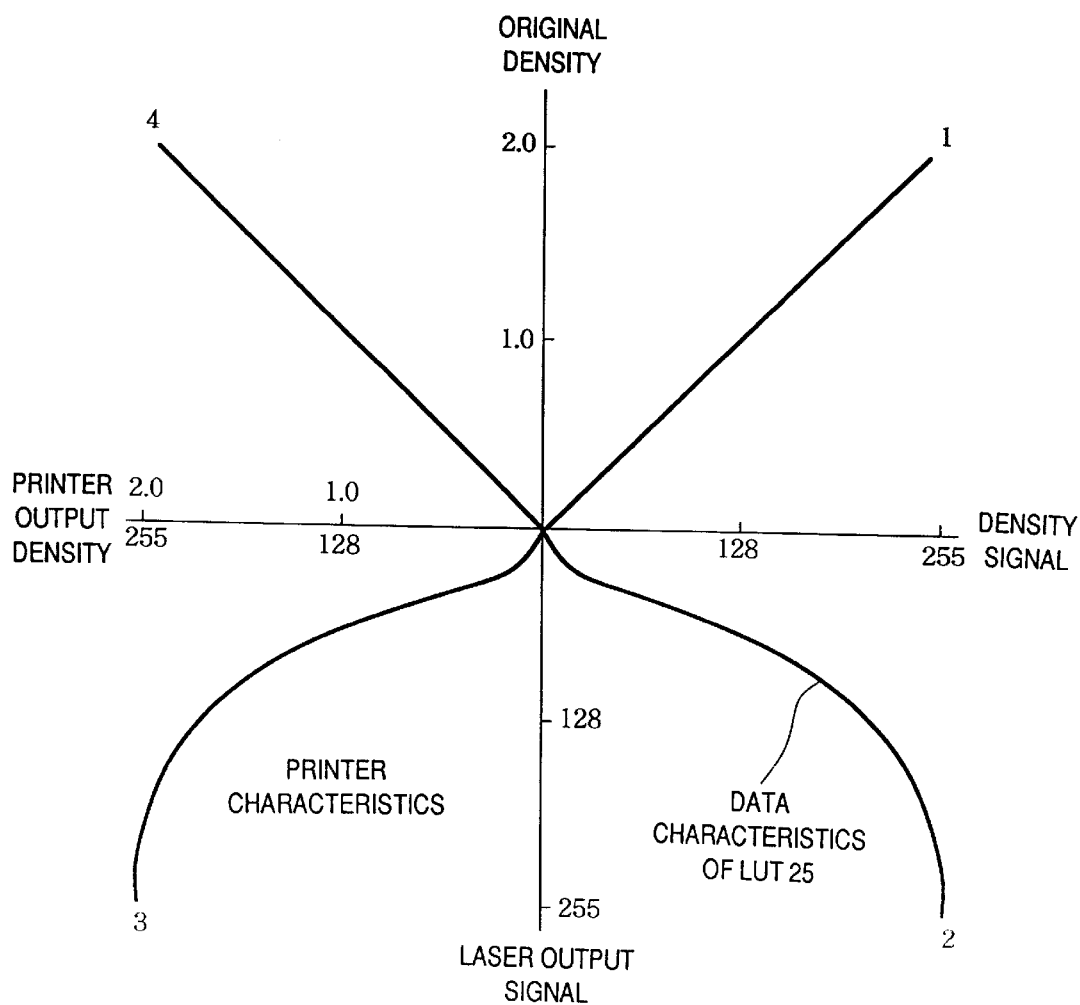
FIG. 4 is a quadrant chart showing gradation reproducibility of the first embodiment.

FIG. 4 is a quadrant chart showing the characteristics for density reproduction of an original image.

Referring to FIG. 4, the first quadrant shows the characteristics of the reader 202 for converting an original density into a density signal, and the second quadrant shows the characteristics of the γ-LUT 25 for converting the density signal into a laser output signal.

The third quadrant shows the characteristics of the printer for converting the laser output signal into a printer output density, and the fourth quadrant shows the relationship between the original density and the printer output density. In other words, the characteristics shown in the fourth quadrant represent the overall gradation characteristics in the copying machine of this embodiment.

In this embodiment, in order to obtain linear gradation characteristics, as shown in the fourth quadrant in FIG. 4, a distortion of the recording characteristics of the printer shown in the third quadrant is corrected by the γ-LUT 25 shown in the second quadrant.

In this embodiment, since an image signal is processed as an 8-bit digital signal, the number of gradation levels is 256.

In this embodiment, the above-mentioned γ-LUT 25 is generated based on an arithmetic operation result (to be described below). In this case, this embodiment has as its object to generate the γ-LUT 25 in consideration of a change in density due to an elapse of time after image data is output from the printer.

More specifically, it is known that the density of an output sample, which has just finished a fixing process, is unstable. For example, immediately after the thermal fixing process, a change in density of output toner image due to a change in temperature is large, and the physical properties of a toner on the output sample change. As a result, the surface state of the output sample changes as the temperature of the sample becomes close to room temperature.

Furthermore, it is also known that silicone oil is coated on the roller surface so as to prevent a toner image from becoming attached to a fixing roller, i.e., to improve separation characteristics. Immediately after the fixing process, the silicone oil remains on the surfaces of a support member and a toner layer, and is absorbed in the support member as time elapses. This results in reductions in glossiness, density, and the like.

Figure 5:
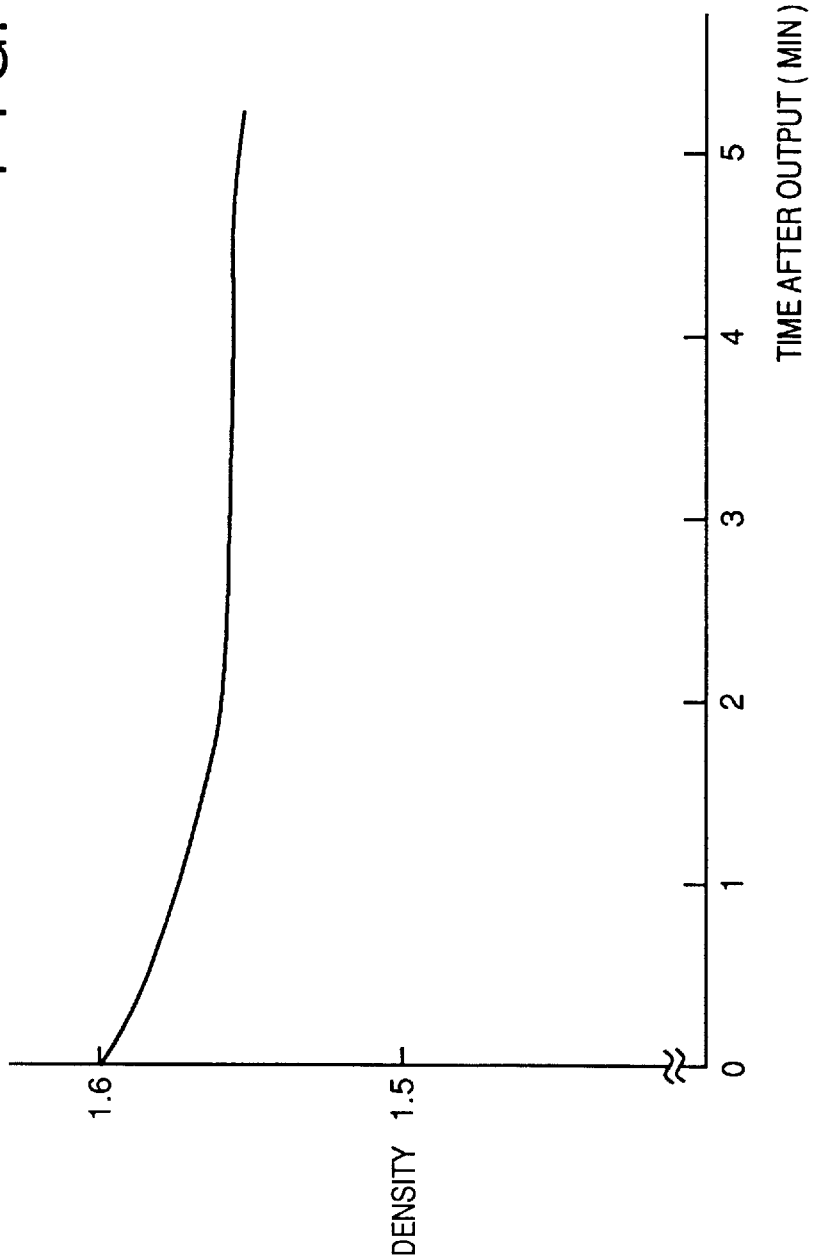
FIG. 5 is a graph showing the relationship between the time elapsed after a gradation test pattern is output and the image density according to the first embodiment.

FIG. 5 shows an example of a change in density of image data as time elapses after the image data is output by the printer. In FIG. 5, the time elapsed after an image is formed and output by the printer on the basis of image data is plotted along the abscissa, and the optical density obtained by reading density level "255" of an output image using the CCD line sensor 21 is plotted along the ordinate.

In the electrophotography system of this embodiment, image data representing the optical density is stabilized about 3 hours after the image is output from the printer. In particular, within the first one minute, the image data changes radically.

More specifically, the image density is very unstable immediately after the fixing process. However, when the output toner is exposed to the air and its temperature becomes close to room temperature, the variation width becomes constant. About 3 hours are required to stabilize the image density. However, radical changes in image density cease to occur within one minute.

Therefore, in this embodiment, in order to stably extract a density with high reproducibility despite a change in density, the timer 213 in the main body is started after a gradation pattern is output, and after an elapse of one minute, the output image is read by the reader.

One minute is set as a time period which is required until a low density change rate is obtained and which allows completion of an operation for reliably placing an output sample on an original table of the reader without a special hurry. For this reason, this time period is preferably optimized for each image forming apparatus.

Setting control of the above-mentioned γ-LUT 25 by the CPU 28 will be described below.

Figure 6:
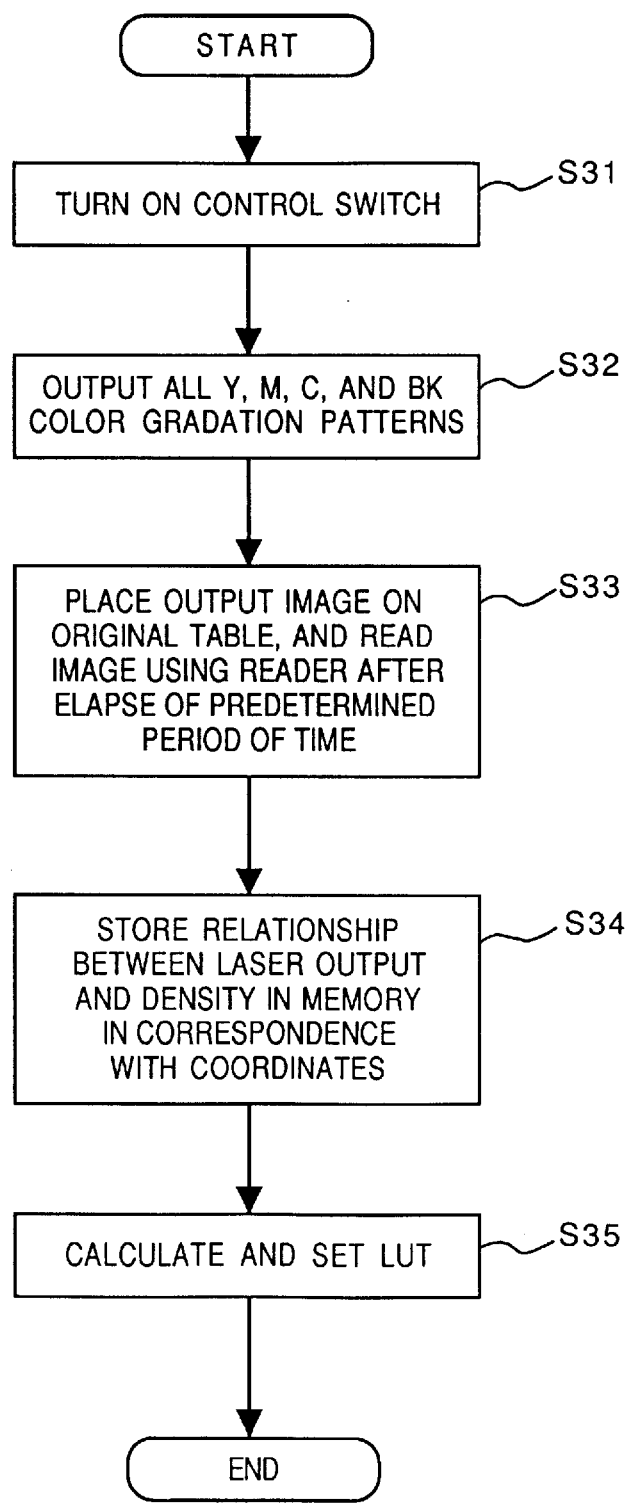
FIG. 6 is a flow chart showing γ-LUT updating processing in the first embodiment.

FIG. 6 is a flow chart showing the generation sequence of the γ-LUT 25 by the CPU 28 in this embodiment. In step S31, a control switch, on the operation panel 300, for starting generation of a γ-LUT is turned on.

Figure 7:
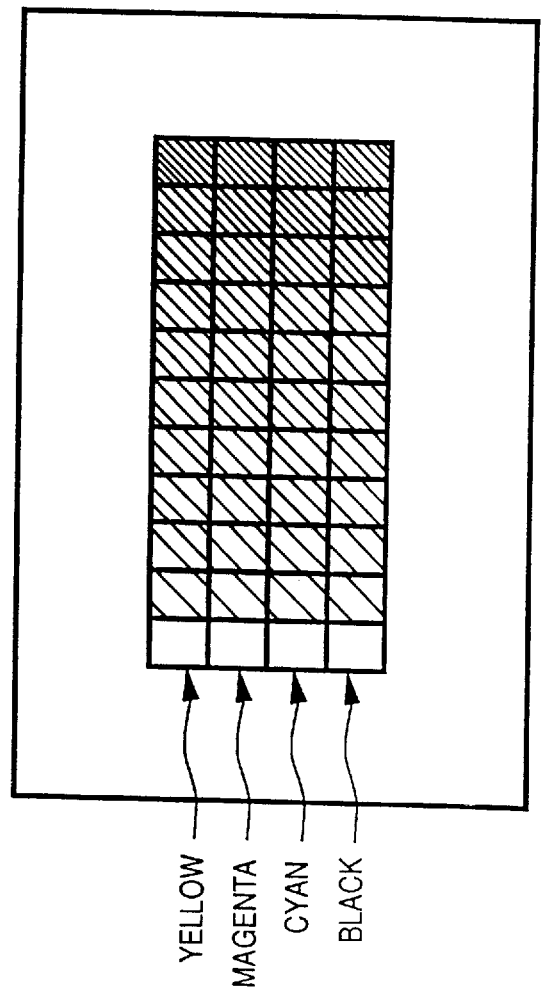
FIG. 7 is a view showing an output example of the gradation test pattern of the first embodiment.

The flow advances to step S32, the pattern generator 29 shown in FIG. 3 outputs a gradation test pattern including all Y, M, C, and Bk color patterns in accordance with a gradation test pattern registered in the test pattern memory area 211 in the ROM 210 of the printer controller 201, and the timer 213 in the main body shown in FIG. 1 is started. FIG. 7 shows an example of the gradation test pattern including all the color patterns.

Note that the gradation test pattern including all the color patterns must be output without using the previous γ-LUT 25 (or by setting linear input/output characteristics of the γ-LUT 25), as shown in FIG. 3.

In step S33, an output image is placed on the original table. When the timer 213 has measured an elapse of a predetermined time period (one minute in this embodiment) pre-stored in the RAM 212 from the output of the image, the gradation test pattern (e.g., an original formed with the gradation test pattern shown in FIG. 7) output in step S32 is placed on an original table glass 302 as the original 301 to be read, as shown in FIG. 1, and is illuminated with light emitted from the light source 303. Then, light reflected by the original is converted into a reflected light amount signal by the CCD line sensor 21 via the color-separation optical system 304. The reflected light amount signal is LOG-converted by the LOG converter 24 shown in FIG. 3, and the converted data is fetched by the CPU 28 as read density data.

The flow then advances to step S34, and a correspondence between the laser output level upon reading of the gradation test pattern in step S33 and the density value of the read gradation test pattern is determined on the basis of the coordinate positions of the gradation test pattern, thus obtaining a relationship between the laser output level and the read density. The relationship is stored in the RAM 212.

The flow advances to step S35. In step S35, the printer characteristics shown in the third quadrant in FIG. 4 are calculated on the basis of the relationship between the laser output level and the read density obtained in step S34. By reversing the input/output relationship of the printer characteristics, the γ correction characteristics of the printer shown in the second quadrant are determined in units of densities, thereby setting a γ-LUT 25.

Upon calculation of the γ-LUT 25 in step S35, since only data corresponding to the number of gradation patterns included in the gradation test pattern are available, intermediate short data must be generated by data interpolation so as to determine correspondences between all density signal levels "0" to "255" and the laser output levels.

The generation sequence of the γ-LUT 25 in this embodiment is completed, as described above, and a message "ready to copy" is displayed on the operation panel 300 to inform a user that the printer is ready to perform a copy operation. Thereafter, the apparatus is set in a copy standby state.

When the image signal processing unit shown in FIG. 3 performs γ correction using the γ-LUT 25 which is generated as described above, a linear relationship shown in the fourth quadrant in FIG. 4 can be maintained between the density stabilized after an image is output by the printer and the original density.

In this embodiment, the gradation test pattern is read when one minute has elapsed after the gradation test pattern is output. This time period is set since a low density change rate shown in FIG. 5 is obtained after an elapse of one minute from the output of the gradation test pattern, and an operation for placing the output gradation pattern on the original table glass 302 to read the test pattern can be sufficiently completed within one minute. Of course, it is preferable to set a time period optimized for each image forming apparatus.

As described above, according to this embodiment, the γ-LUT 25 is set in correspondence with density information obtained by reading a gradation test pattern set on an original table after an elapse of a predetermined period of time from the end of the fixing operation of the gradation test pattern on a paper sheet. Thus, the density stabilized after an image is output by the printer can have a linear relationship with the density of an original image, and high gradation characteristics can be obtained. When the above-mentioned control is periodically performed, an image with high gradation characteristics and a good color balance can be formed over a long period of time.

<Modification of First Embodiment>

In the image forming apparatus of this embodiment, in order to fix multi-color toners, silicone oil is coated on the surfaces of the fixing rollers 114 in a fixing unit, thereby preventing an offset of an image.

The silicone oil is also coated on a formed image and a recording medium, and gloss as one image characteristic improves.

However, it is known that, as time elapses, since the silicone oil is absorbed in the surface layer of the recording medium or is evaporated in the air, the gloss is gradually lost.

Figure 35:
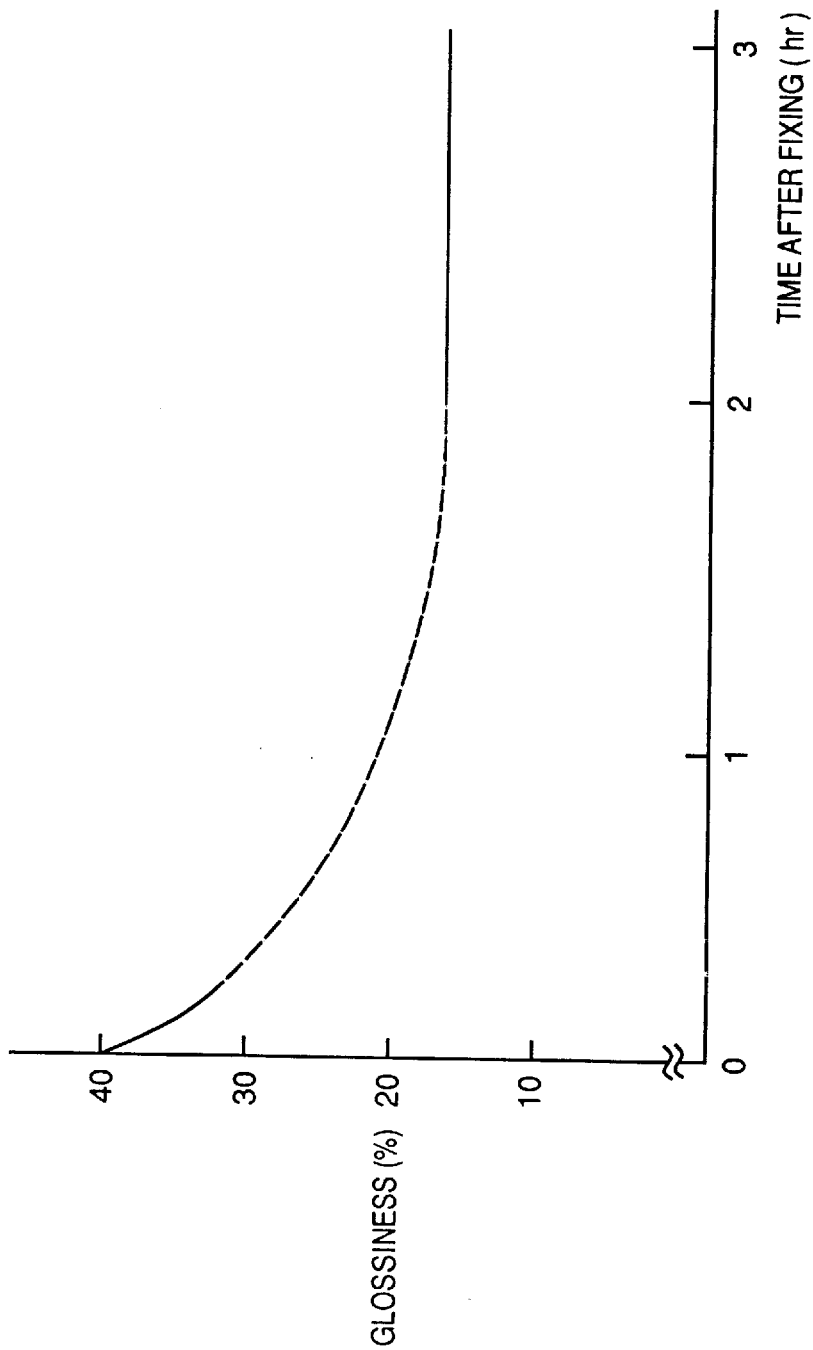
FIG. 35 is a view for explaining a modification of the first embodiment.

FIG. 35 shows a state of a change in gloss.

The time after the fixing process is plotted along the abscissa, and the glossiness is plotted along the ordinate.

The glossiness has a correlation with the reduction rate of the density, and the gloss is stabilized in about 2 hours.

However, within a time range from 15 minutes to 2 hours after the fixing process, gloss nonuniformity occurs depending on a difference in toner amount and a nonuniform silicone oil coating amount on the fixing rollers, and the glossiness varies locally and cannot be specified. Therefore, on the graph in FIG. 35, the glossiness during this period is indicated by a broken curve plotting an average value.

In this manner, in an unstable gloss state, the density is also unstable, and it is not preferable to feed back data obtained based on the density measured during this time period to the image forming condition in terms of control.

Figure 36:
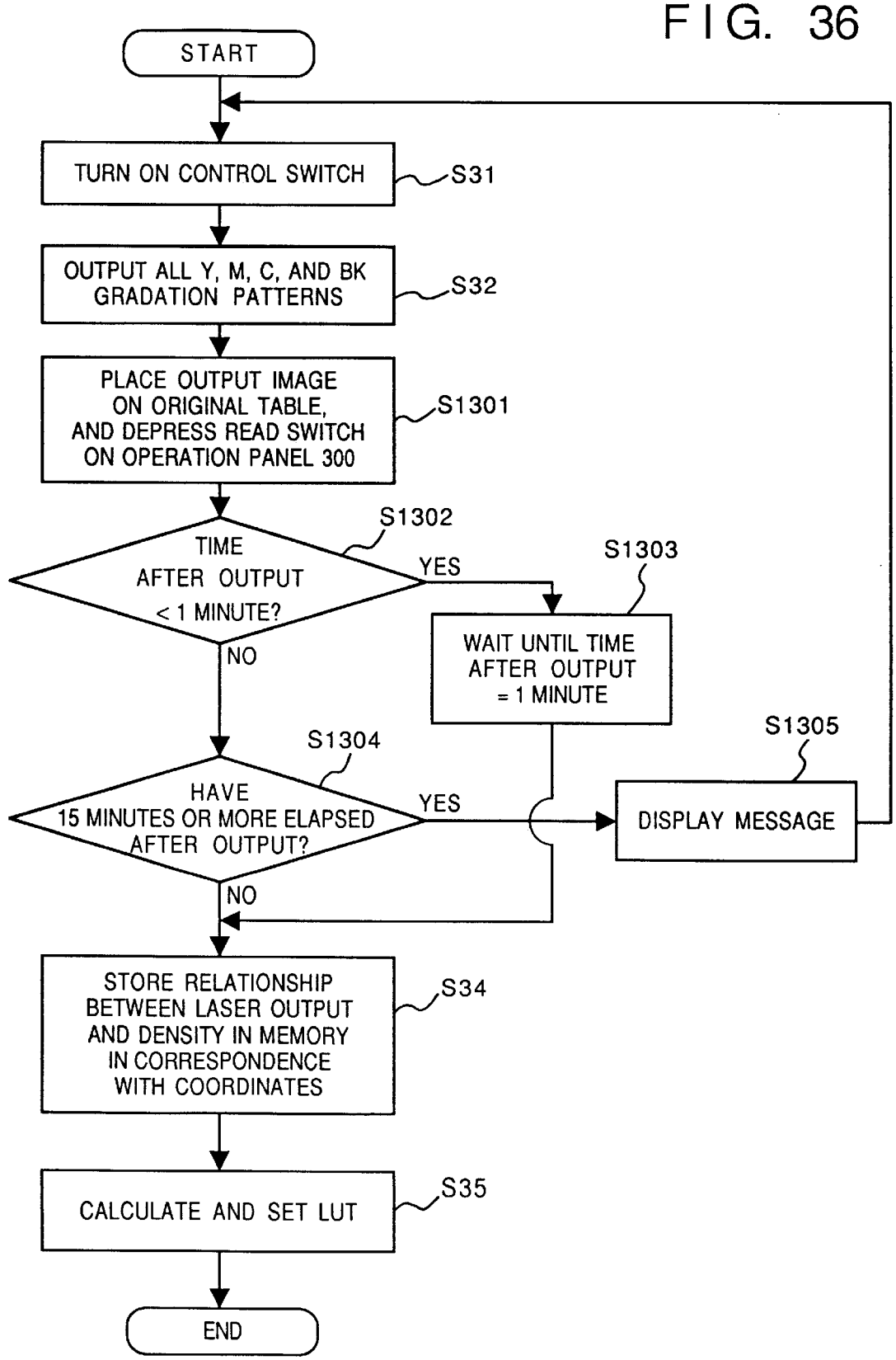
FIG. 36 is a flow chart showing processing in the modification of the first embodiment.

FIG. 36 shows the control flow in this modification.

In step S31, a control switch, on the operation panel 300, for starting generation of a γ-LUT is turned on.

The flow advances to step S32 to output a gradation test pattern including all the color patterns, and the timer 213 in the main body shown in FIG. 1 is started. Note that the gradation test pattern must be output without using the previous γ-LUT 25.

In step S1301, an output image is placed on an original table, and a reading switch prepared on the operation panel 300 is depressed.

In step S1302, it is checked if the depression timing of the reading switch is within one minute from the output of the gradation test pattern.

If YES in step S1302, the flow advances to step S1303 to wait for the lapse of one minute from the output of the gradation test pattern.

However, if NO in step S1302, the flow advances to step S1304 to check if 15 minutes or longer have elapsed from the output of the gradation test pattern.

If YES in step S1304, the flow advances to step S1305 to display a message indicating that the above-mentioned operation is to be re-done from the output of the gradation test pattern, and the flow returns to the start of the control.

In this manner, only when the time required from when the gradation test pattern is output until the pattern is read falls within a range from one minute to 15 minutes, the relationship between the laser output and the density is fetched in the memory in correspondence with the coordinate positions (step S34).

Based on these data, a γ-LUT 25 is calculated and set (step S35).

The generation sequence of the γ-LUT 25 in this embodiment is completed, as described above, and a message "ready to copy" is displayed on the operation panel 300 to inform a user that the printer is ready to perform a copy operation. Thereafter, the apparatus is set in a copy standby state.

In this modification, as the time required from when the gradation test pattern is output until the pattern is read, a time range from one minute to 15 minutes is adopted. This time range is preferably optimized depending on the fixing setting temperature and the silicone oil coating amount.

As described above, in this modification, the density of the gradation pattern can be read while avoiding the time period in which gloss nonuniformity influences the density after the gradation pattern is output. Therefore, measurement accuracy of the read density can be improved, and good gradation characteristics can be obtained.

<Second Embodiment>

The second embodiment according to the present invention will be described below.

Figure 8:
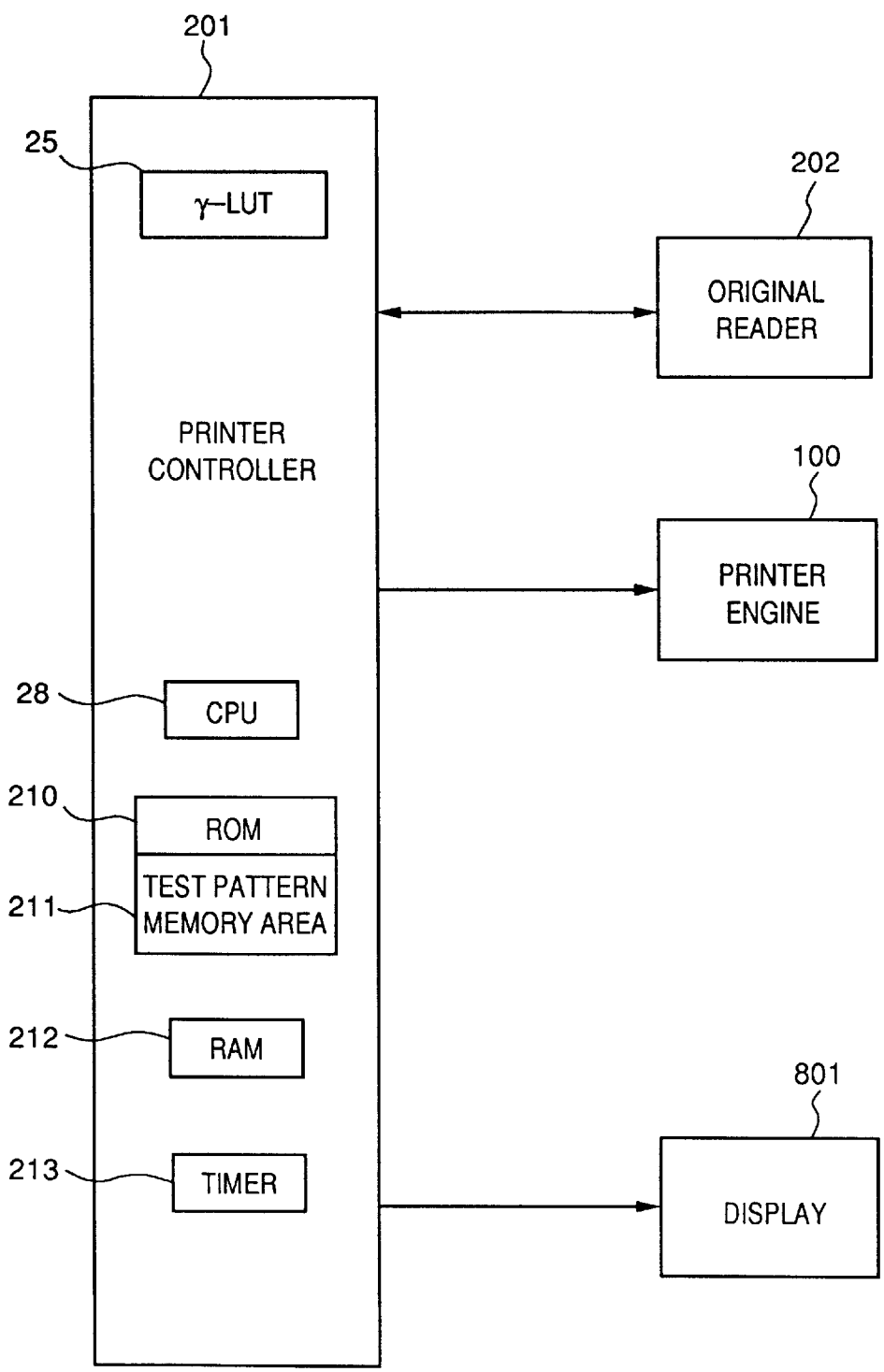
FIG. 8 is a schematic block diagram showing the arrangement of the second embodiment according to the present invention.

FIG. 8 is a schematic block diagram showing the arrangement of a printer apparatus according to the second embodiment. The same reference numerals in FIG. 8 denote the same parts as in the block diagram in FIG. 1 in the first embodiment described above, and a detailed description thereof will be omitted.

The difference from the above-mentioned first embodiment is that a display 801 is added. The display 801 is arranged on the operation panel 300 shown in FIG. 2.

Figure 9:
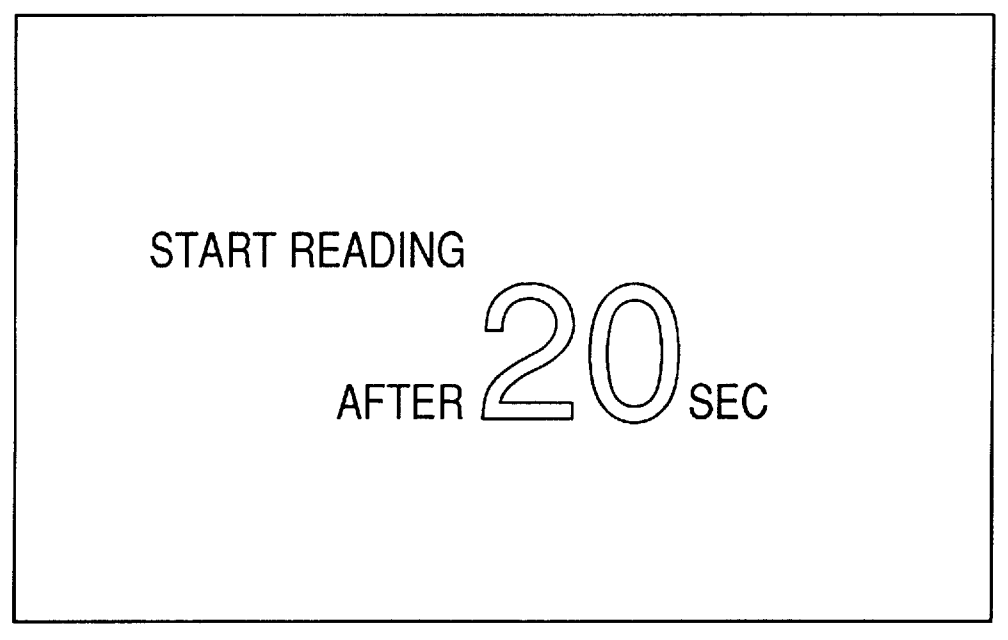

From when a gradation test pattern including all the color patterns shown in FIG. 5 is output until the gradation test pattern is read by the original reader 202 shown in FIG. 1, for example, one minute later, a time (count-down time) until the reader is started is displayed on the display 801 on the basis of the measurement of the timer 213, as shown in FIG. 9.

As described above, according to the second embodiment, interfacing between the image forming apparatus and a user can be greatly improved, and an operation error of a user such as failure of placing an original can be eliminated, thus improving work efficiency.

<Third Embodiment>

The third embodiment according to the present invention will be described below.

The third embodiment has as its object to prevent an operation error of the printer apparatus due to an operation error of a user as much as possible.

Since the schematic arrangement of the printer in the third embodiment is the same as that shown in FIGS. 1 to 3 of the first embodiment, the third embodiment will be described below with reference to FIGS. 1 to 3, FIG. 7, and FIG. 10.

Figure 10:
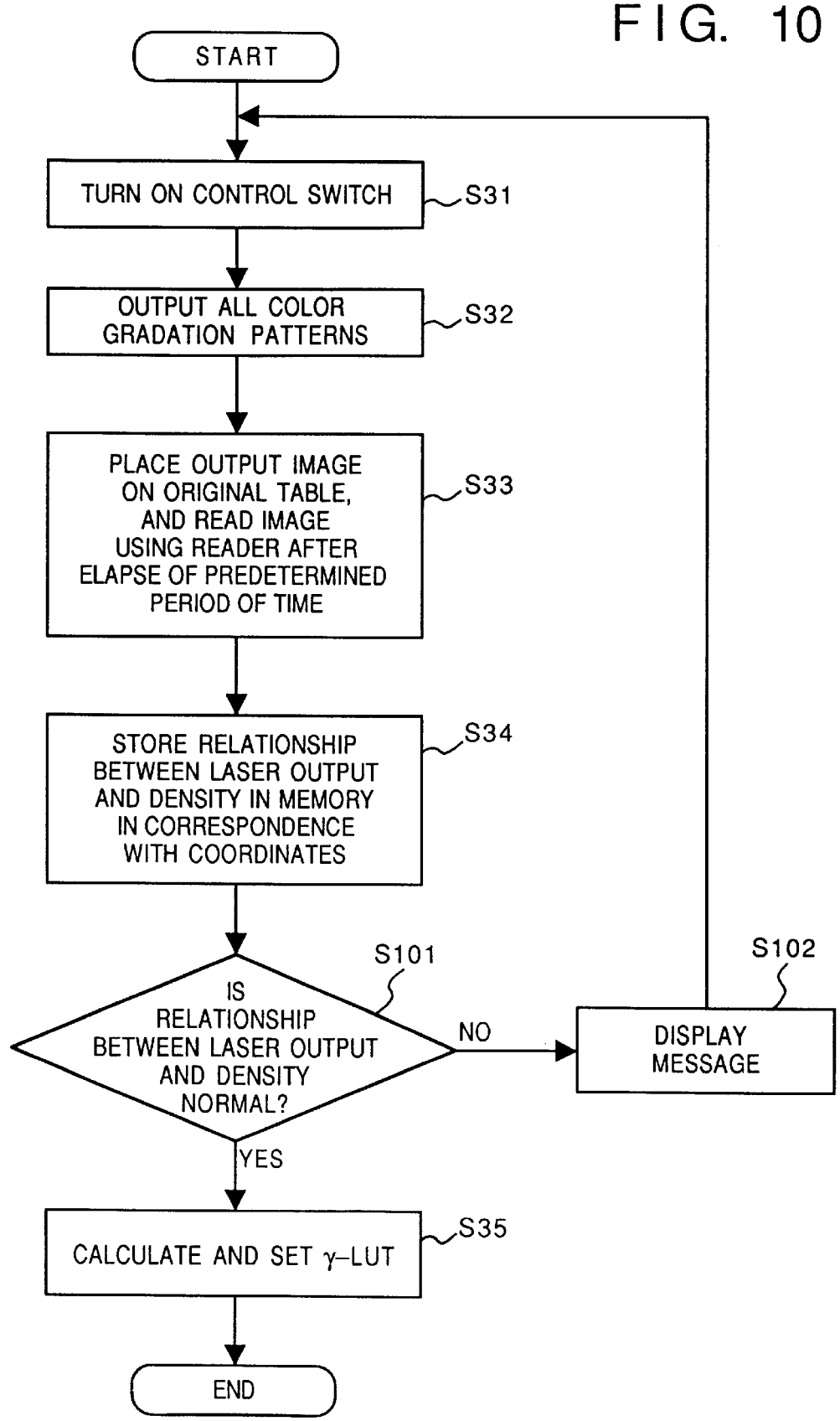
FIG. 10 is a flow chart showing γ-LUT updating processing according to the third embodiment of the present invention.

FIG. 10 is a flow chart showing the generation sequence of the γ-LUT 25 in the third embodiment. In step S31, a control switch, on the operation panel 300 in FIG. 2, for starting generation of a γ-LUT is turned on.

The flow advances to step S32, the pattern generator 29 shown in FIG. 3 outputs a gradation test pattern including all Y, M, C, and Bk color patterns in accordance with a gradation test pattern registered in the test pattern memory area 211 in the ROM 210 of the printer controller 201, and the timer 213 in the main body shown in FIG. 1 is started. FIG. 7 shows an example of the gradation test pattern including all the color patterns.

Note that the gradation test pattern including all the color patterns must be output without using the previous γ-LUT 25, as shown in FIG. 3.

In step S33, when the timer 213 has measured an elapse of a predetermined time period (i.e., one minute) pre-stored in the RAM 212 from the output of the image, an original formed with the gradation test pattern output in step S32 is placed on the original table glass 302 as the original 301 to be read shown in FIG. 1, and is illuminated with light emitted from the light source 303. Then, light reflected by the original is converted into a reflected light amount signal by the CCD line sensor 21 via the color-separation optical system 304. The reflected light amount signal is LOG-converted by the LOG converter 24 shown in FIG. 3, and the converted data is fetched by the CPU 28 as read density data.

The flow then advances to step S34, and a correspondence between the laser output level upon reading of the gradation test pattern in step S33 and the density value of the read gradation test pattern is determined for the respective coordinate positions of the gradation test pattern, thus obtaining a relationship between the laser output level and the read density. The relationship is stored in the RAM 212.

Then, it is checked in step S101 if the relationship between the laser output level and the read density is normal.

If it is determined in step S101 that the relationship between the laser output level and the read density is normal, it indicates that the gradation test pattern is placed on a predetermined position on the original table glass. Contrary to this, if it is determined in step S101 that the relationship between the laser output level and the read density is abnormal, it indicates a state, including failure of placing the gradation test pattern by a user, wherein the gradation test pattern cannot be normally read.

Figure 11:
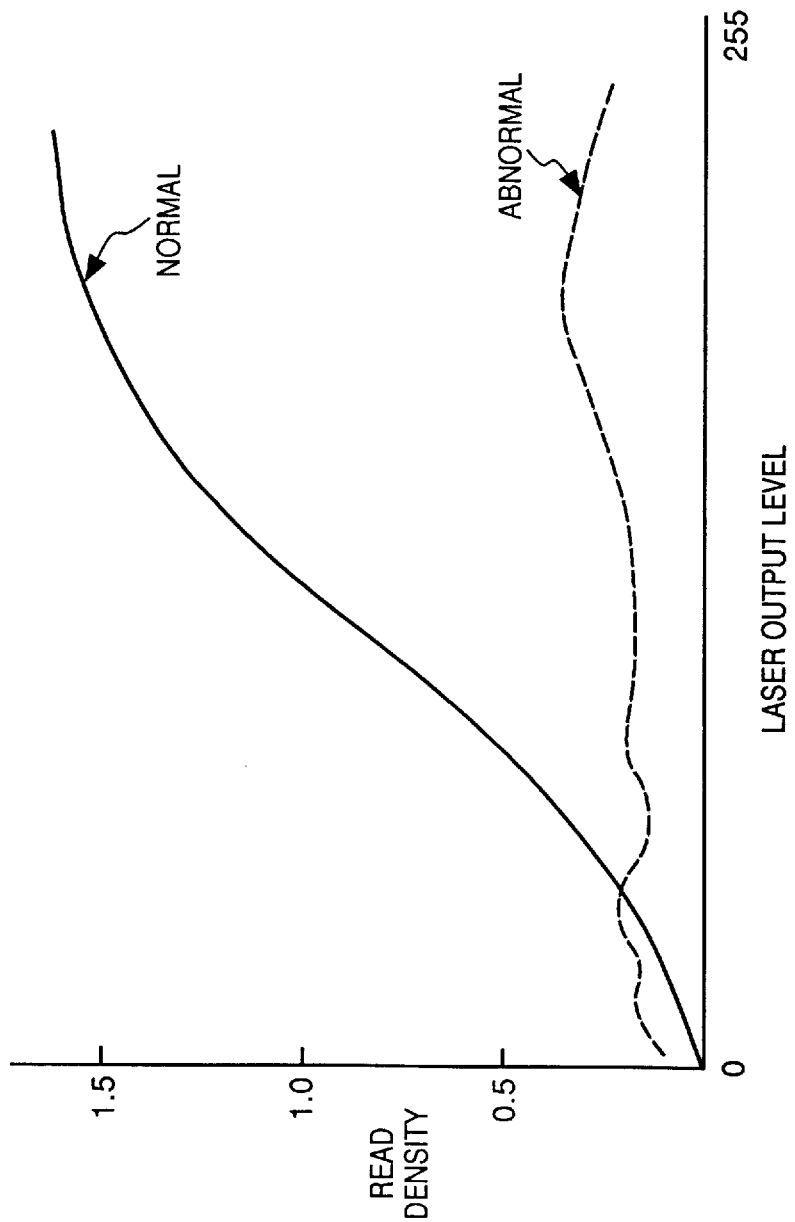
FIG. 11 is a graph showing the relationship between the laser output level and the reading density in the third embodiment.

FIG. 11 shows the relationship between the laser output level and the read density. As can be seen from FIG. 11, when the relationship is normal, the read density has a sufficiently wide range, the read density tends to increase as the laser output level increases, and the relationship is never reversed. In contrast to this, when the relationship is abnormal due to, e.g., failure of placing the gradation test pattern, the original reader 202 reads the pressing plate surface of the original table. Therefore, as indicated, e.g., by a broken curve in FIG. 11, the read density has a narrow range, and the read density may sometimes decrease as the laser output level increases.

In step S101, whether or not the relationship is normal is checked by checking if the following condition formulas are satisfied:

$$\begin{cases} D\max - D\min \geq k \\ D(n+1) \geq D(n) \end{cases}$$

where Dmax is the maximum read density, Dmin is the minimum read density, k is a coefficient, and D(n) is the read density of the laser output at level n.

If it is determined in step S101 that the relationship between the laser output and the read density is abnormal, the flow advances to step S102, and a message indicating this is displayed on the display 801. The flow then returns to step S31 to re-do the above-mentioned operation from depression of the control switch.

If it is determined in step S101 that the relationship between the laser output and the read density is normal, the flow advances to step S35, and thereafter, a γ-LUT 25 is set in the same manner as in the first embodiment shown in step S35 in FIG. 6.

In the third embodiment, the gradation test pattern is read after an elapse of one minute from the output of the gradation test pattern. However, as in the first embodiment, it is preferable to optimize this time for each image forming apparatus.

As described above, in the third embodiment, even when the gradation test pattern cannot be read due to an operation error of a user, an operation error of gradation control can be prevented by checking the relationship between the laser output and the read density, and good gradation characteristics can be obtained more reliably.

In each of the first to third embodiments described above, an electrophotography type laser beam printer has been exemplified. However, the present invention is not limited to this, but may be applied to, e.g., an ink-jet printer, a dot-matrix printer, and the like. The same applies to embodiments to be described below.

As described above, according to the first to third embodiments, since a gradation test pattern is read after an elapse of a predetermined period of time from the formation of the gradation test pattern, the correction amount can be controlled by a stable image density, and an image with high gradation characteristics can be formed.

Also, when gradation correction using a gradation test pattern in each of the above embodiments is periodically performed, an image with high gradation characteristics and a good color balance can be formed over a long period of time.

<Fourth Embodiment>

Figure 12:
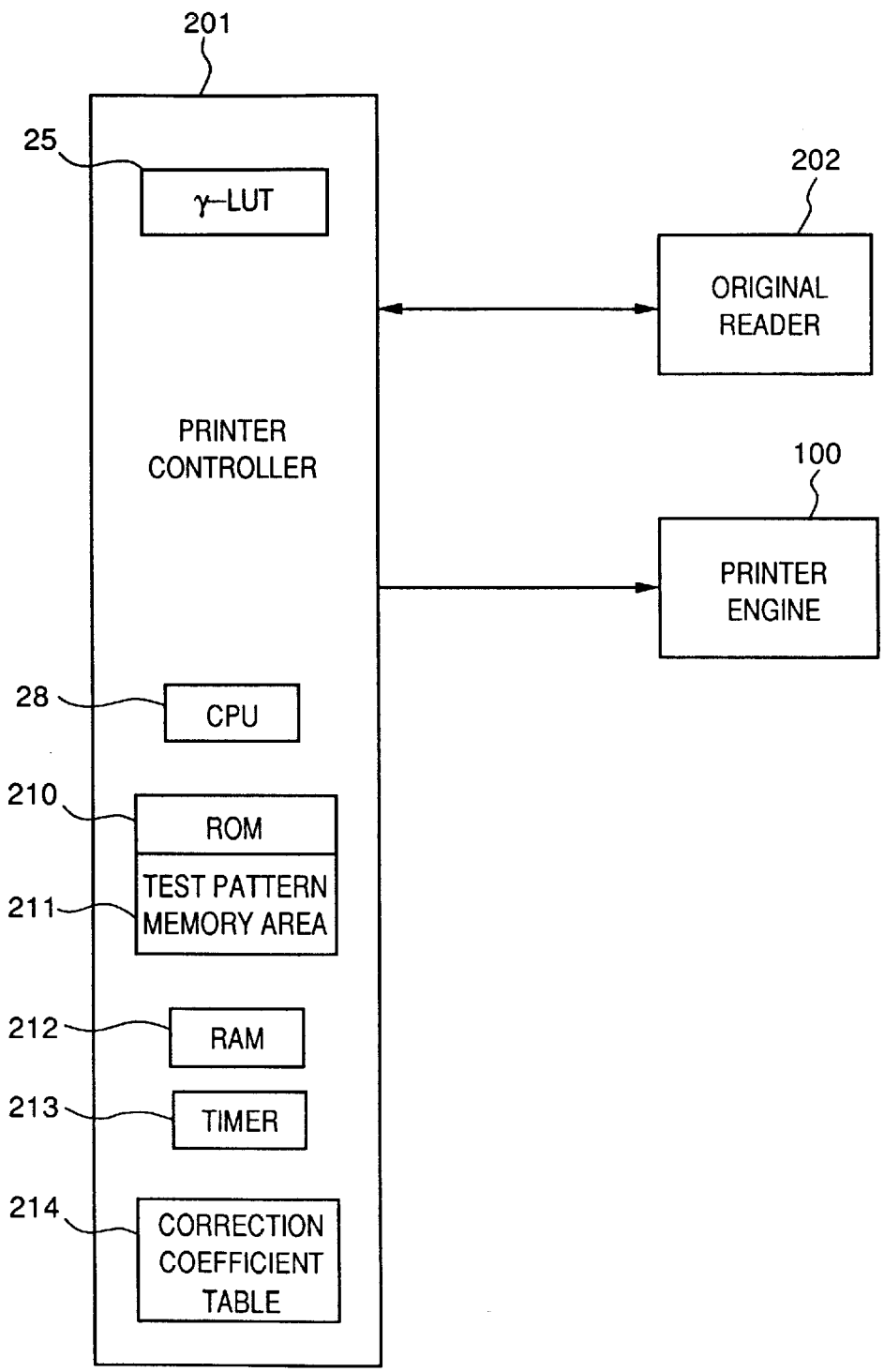
FIG. 12 is a schematic block diagram showing the fourth embodiment according to the present invention.

FIG. 12 is a schematic block diagram showing the arrangement of a color copying machine of this embodiment.

Referring to FIG. 12, reference numeral 201 denotes a printer controller for controlling the entire copying machine. The printer controller 201 comprises a CPU 28 such as a microprocessor, a ROM 210 for storing control programs for the CPU 28 and various data, a RAM 212 used as a work area of the CPU 28, and the like. The ROM 210 includes a test pattern memory area 211 which stores a gradation test pattern (to be described later).

Reference numeral 202 denotes an original reader, which comprises a CCD line sensor 21 and the like (to be described later). The original reader 202 reads an original image, processes the read image signal, and outputs the processed signal to the printer controller 201. The printer controller 201 corrects the image signal supplied from the original reader 202 using a look-up table 25 for γ correction (γ-LUT) to convert the image signal into data matching the output characteristics of a printer engine 100, and outputs the converted data to the printer engine 100. Reference numeral 100 denotes a printer engine, which comprises the same laser beam printer as that shown in FIG. 2 in this embodiment.

Reference numeral 213 denotes a timer; and 214, a correction coefficient table of this embodiment, which will be described in detail later.

Note that the arrangement of the image processing unit is also the same as that shown in FIG. 3.

This embodiment has as its object to set the γ-LUT 25 in correspondence with a change in density which is caused by the elapse of time after image data is output by the printer.

Figure 13:
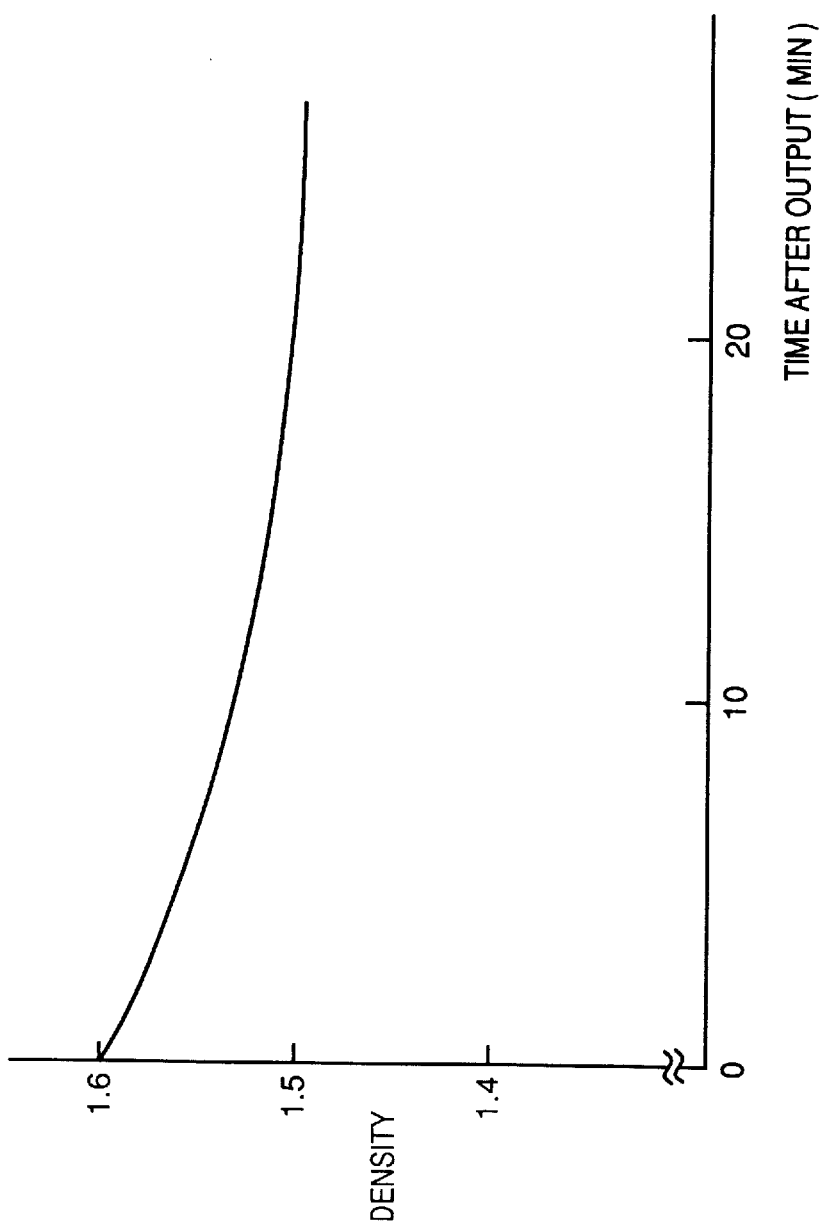
FIG. 13 is a graph showing the relationship between the time elapsed after a gradation test pattern is output and the image density in the fourth embodiment.

FIG. 13 shows an example of a change in density of an output image as time elapses after the image is output by the printer. In FIG. 13, the time elapsed after an image is output by the printer is plotted along the abscissa, and the optical density of the density level "255" of an output image is plotted along the ordinate.

About 3 hours are required to stabilize an output image after the image is output by the printer. In particular, the density change amount is large for about several minutes after the output of the image.

The setting operation of the γ-LUT 25 by the above-mentioned CPU 28 will be described below.

Figure 14:
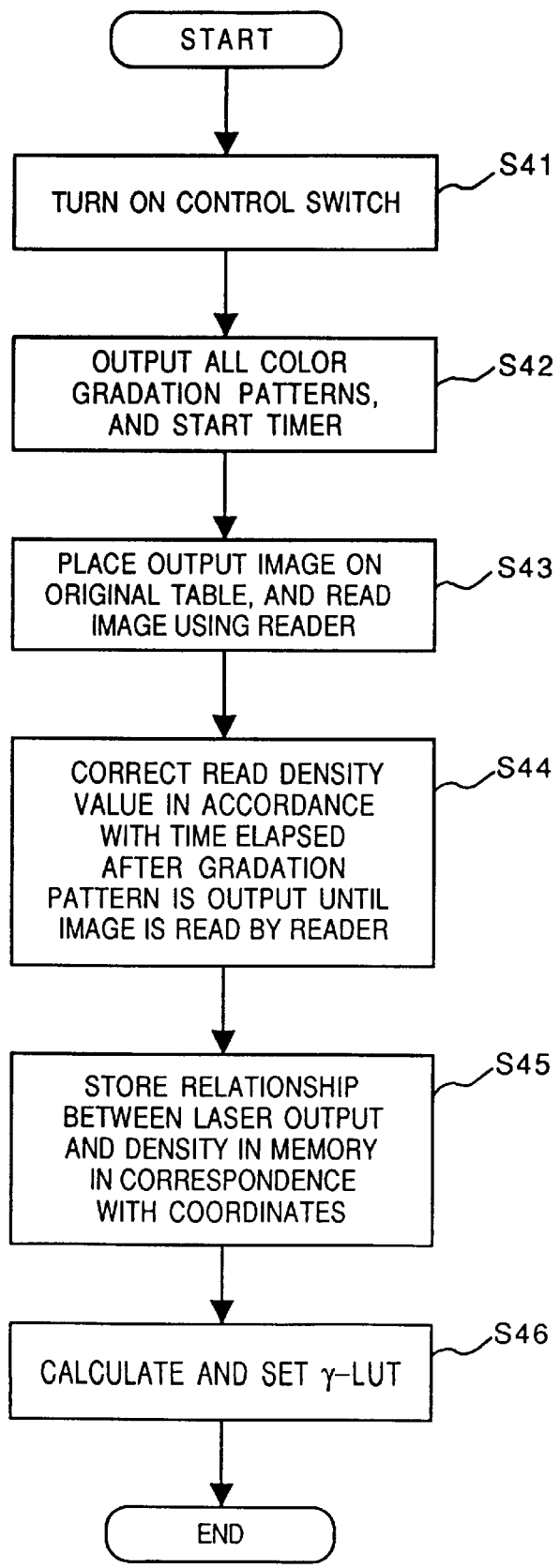
FIG. 14 is a flow chart showing γ-LUT updating processing in the fourth embodiment.

FIG. 14 is a flow chart showing the setting sequence of the γ-LUT 25 by the CPU 28 in this embodiment. In step S41, a control switch, on an operation panel 300, for starting generation of a γ-LUT is turned on.

The flow advances to step S42, the pattern generator 29 shown in FIG. 3 outputs a gradation test pattern including all Y, M, C, and Bk color patterns in accordance with a gradation test pattern registered in the test pattern memory area 211 in the ROM 210 of the printer controller 201, and the timer 213 in the main body shown in FIG. 12 is started. The gradation test pattern including all the color patterns is the same as that shown in FIG. 7.

Note that the gradation test pattern including all the color patterns must be output without using the previous γ-LUT 25, as shown in FIG. 3.

In step S43, an original formed with the gradation test pattern shown in FIG. 7 and output in step S42 is placed on an original table glass 302 as an original 301 to be read shown in FIG. 2, and is illuminated with light emitted from the light source 303. Then, light reflected by the original is converted into a reflected light amount signal by the CCD line sensor 21 via the color-separation optical system 304. The reflected light amount signal is LOG-converted by the LOG converter 24 shown in FIG. 3, and the converted data is fetched by the CPU 28 as read density data.

Figure 15:
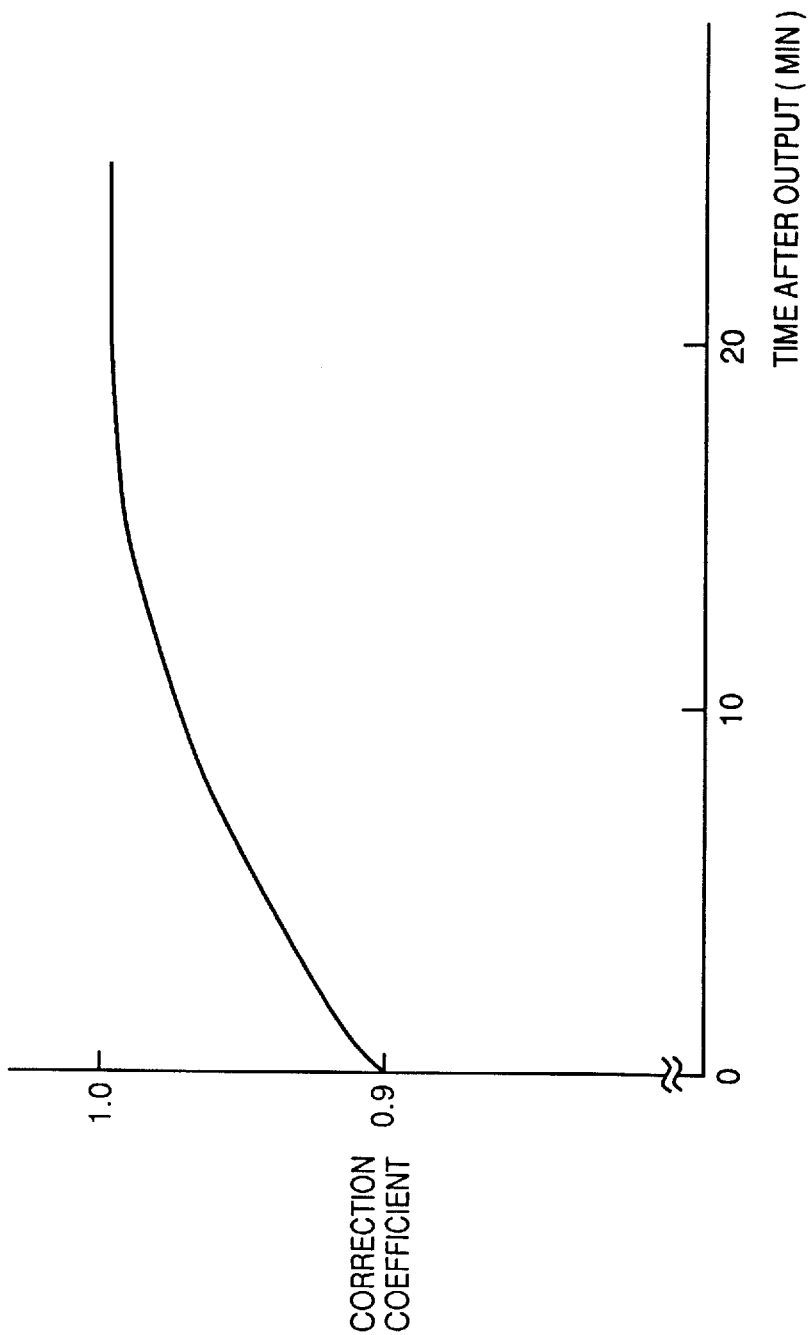
FIG. 15 is a graph showing the relationship between the time elapsed after a gradation test pattern is output and the correction coefficient in the fourth embodiment.

In step S44, the timer 213 started in step S42 measures the time period from when the gradation test pattern is output until the original reader 202 reads the gradation test pattern, and a correction coefficient is obtained from the correction coefficient table 214 having characteristics shown in FIG. 15 in correspondence with the measured time period. The density of the gradation test pattern read by the original reader 202 is multiplied with the obtained correction coefficient, thus performing correction.

The flow then advances to step S45, and a correspondence between the laser output level upon reading of the gradation test pattern in step S43 and the density value of the read gradation test pattern read in step S44 is determined for the respective coordinate positions of the gradation test pattern, thus obtaining a relationship between the laser output level and the read density. The relationship is stored in the RAM 212.

The flow advances to step S45. In step S45, the printer characteristics shown in the third quadrant in FIG. 4 are calculated on the basis of the relationship between the laser output level and the read density obtained in step S44. By reversing the input/output relationship of the printer characteristics, the γ correction characteristics of the printer shown in the second quadrant are determined in units of densities, thereby setting a γ-LUT 25.

Upon calculation of the γ-LUT 25 in step S45, since only data corresponding to the number of gradation patterns included in the gradation test pattern are available, intermediate short data must be generated by data interpolation so as to determine correspondences between all density signal levels "0" to "255" and the laser output levels.

The generation sequence of the γ-LUT 25 in this embodiment is completed, as described above, and a message "ready to copy" is displayed on the operation panel 300 to inform a user that the printer is ready to perform a copy operation. Thereafter, the apparatus is set in a copy standby state.

When the image signal processing unit shown in FIG. 3 performs γ correction using the γ-LUT 25 which is generated as described above, a linear relationship shown in the fourth quadrant in FIG. 4 can be maintained between the density stabilized after an image is output by the printer and the original density.

In this embodiment, the correction coefficient of the correction coefficient table 214 is determined, so that a density stabilized after an elapse of sufficient time from the output of an image is reflected as a density to be controlled. However, if a density immediately after an image is output is to be corrected, the correction coefficient may be set to attain this correction.

In this embodiment, the same correction coefficient is used for multiplication with the entire region of the density signal. Alternatively, different coefficients may be used in units of density regions.

As described above, according to this embodiment, the γ-LUT 25 is set in correspondence with the time period from when the gradation test pattern is fixed on a recording sheet until the recording sheet is placed on the original table to read the density of the gradation test pattern. Thus, the density stabilized after an image is output by the printer can have a linear relationship with the density of an original image, and high gradation characteristics can be obtained. When the above-mentioned control is periodically performed, an image with high gradation characteristics and a good color balance can be formed over a long period of time.

<Fifth Embodiment>

The fifth embodiment according to the present invention will be described below.

As has been described in the fourth embodiment, the output image density changes from a timing immediately after an image is fixed in a printer apparatus or the like. The degree of change in density of an output image varies depending on the temperature and humidity of the air, and such a variation is not negligible in especially an output apparatus which is required to have strict density gradation characteristics.

The fifth embodiment has as its object to remove a distortion of a change in density of an output image depending on the temperature and humidity of the air.

Figure 16:
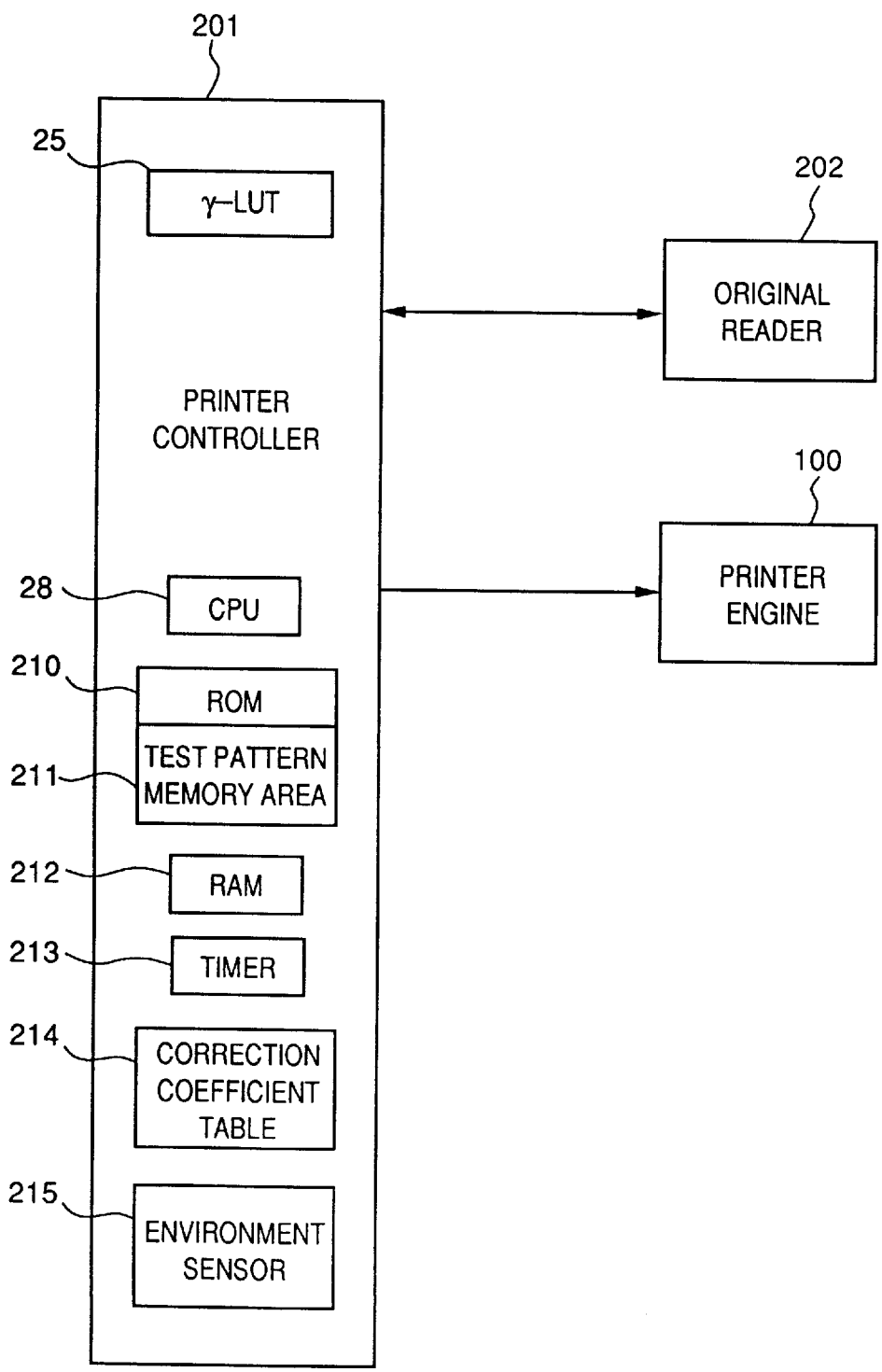
FIG. 16 is a schematic block diagram showing the arrangement of the fifth embodiment according to the present invention.

FIG. 16 is a schematic block diagram showing the arrangement of a printer apparatus according to the fifth embodiment. The same reference numerals in FIG. 16 denote the same parts as in the block diagram of FIG. 12 in the fourth embodiment, and a detailed description thereof will be omitted.

The difference from the above-mentioned fourth embodiment is that an environment sensor 215 is provided to the printer controller 201 to monitor the temperature and humidity of the air.

Figure 17:
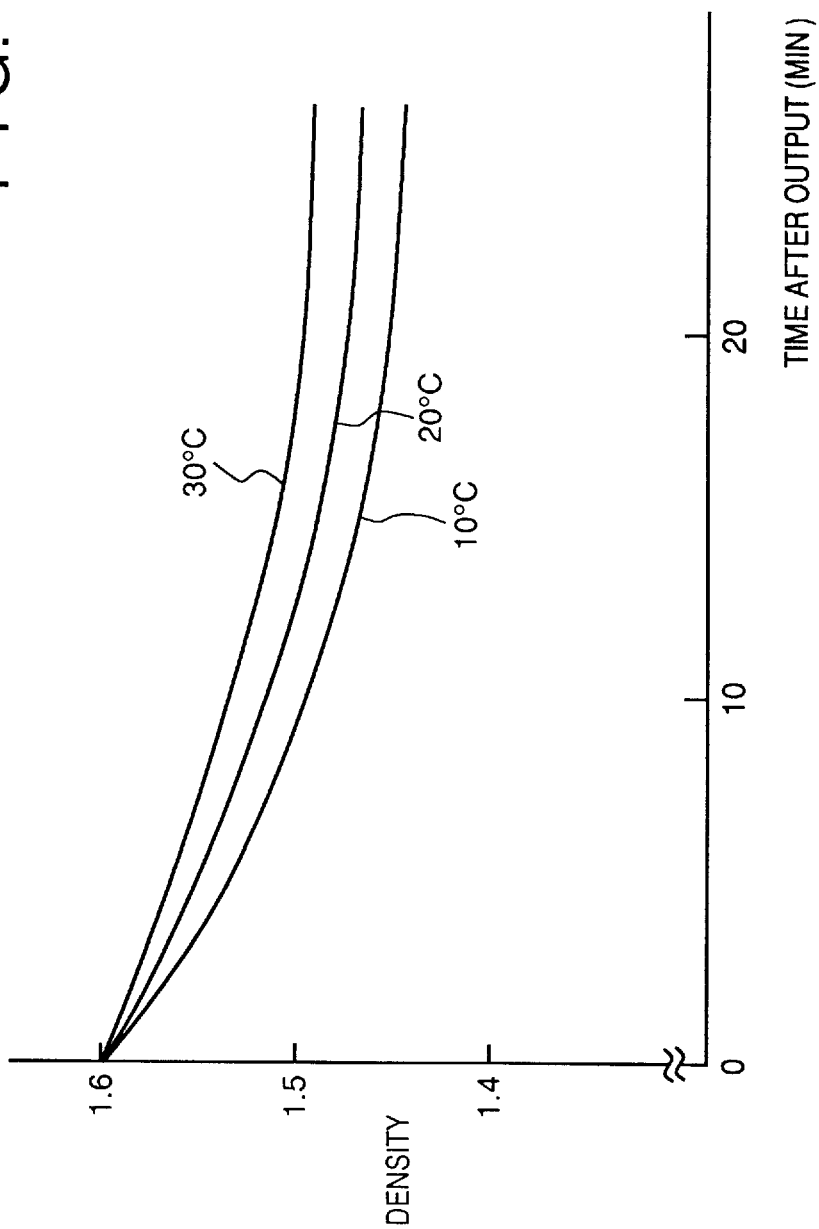
FIG. 17 is a graph showing the relationship between the time elapsed after a gradation test pattern is output and the image density of the gradation test pattern when the ambient temperature is 10° C., 20° C., and 30° C. in the fifth embodiment.

FIG. 17 shows the relationship among the output image density, the elapsed time after the output, and the temperature of the air.

Figure 18:
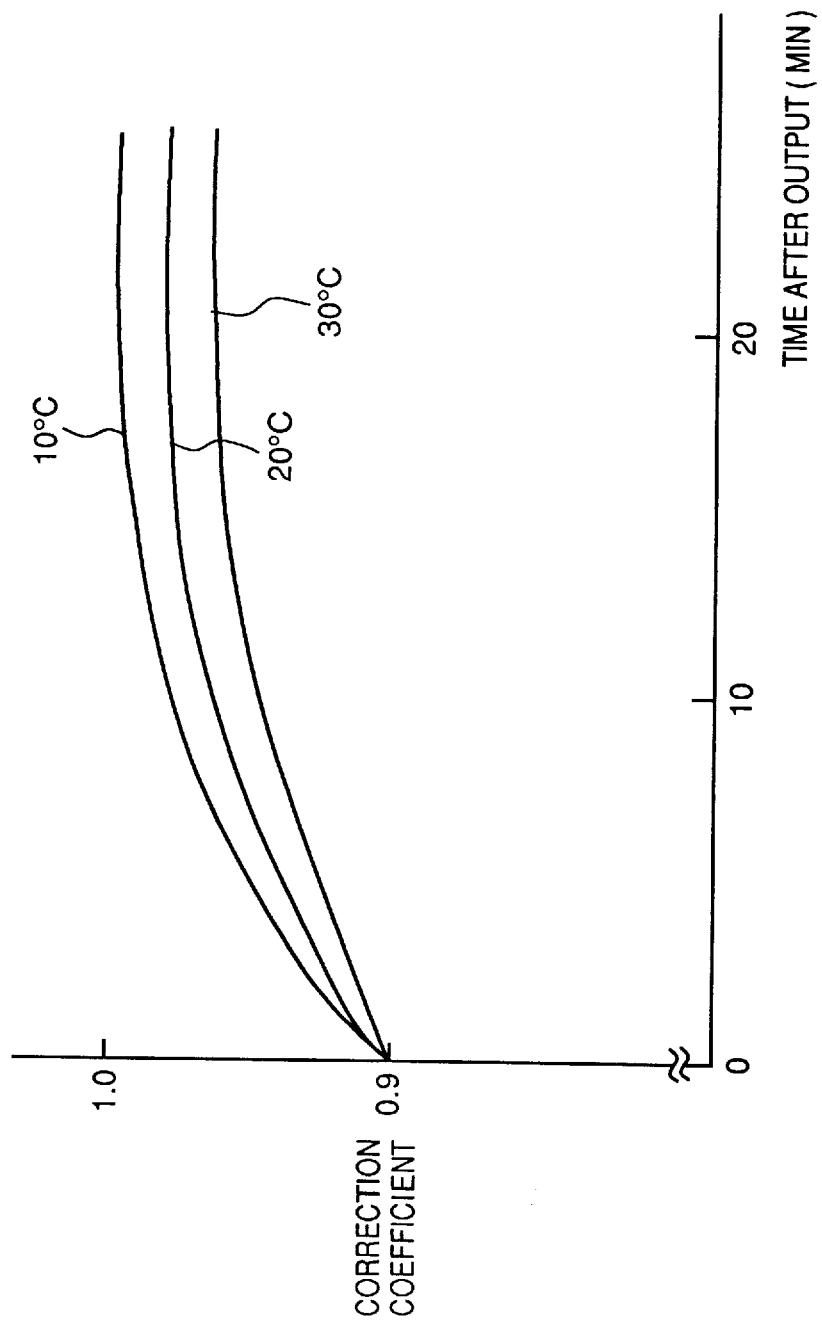
FIG. 18 is a graph showing the relationship between the time elapsed after a gradation test pattern is output and the correction coefficient when the ambient temperature is 10° C., 20° C., and 30° C. in the fifth embodiment.

The relationship among the elapsed time after the output, the correction coefficient, and the temperature of the air is determined on the basis of the characteristics shown in FIG. 17, as shown in FIG. 18, and is set in the correction coefficient table 214. In this case, correction coefficient data when the temperature of the air is, e.g., 10° C., 20° C., and 30° C. are set in the correction coefficient table 214, and correction at an intermediate temperature is performed by interpolation.

With the above-mentioned arrangement, an image density read by the original reader 202 is multiplied with a correction coefficient obtained from the correction coefficient table 214 in correspondence with the temperature detected by the environment sensor 215 and the time elapsed after the image is read, thereby correcting the density.

Thereafter, a γ-LUT 25 is re-generated in substantially the same manner as in the fourth embodiment, except that the temperature detected by the environment sensor 215 is included in a correction condition in the processing in step S44 in the fourth embodiment shown in FIG. 14 in the fifth embodiment.

In the fifth embodiment, of parameters which can be detected by the environment sensor, the temperature has been particularly exemplified. However, this embodiment is not limited to this, and is effective for the following case.

For example, when the molecular amount of silicone oil is small, and the output image density is expected to change due to evaporation of the silicone oil, the humidity has a large influence as a factor for causing a change in density. For this reason, the humidity is preferably adopted as an environment parameter. Also, since the density change characteristics vary depending on, e.g., the types of recording media, the types of recording media may be used as an environment parameter.

As described above, it is preferable to optimize detection parameters in correspondence with materials such as an oil, ink, recording medium, and the like used in the image forming apparatus.

As described above, in the fifth embodiment, even when the output image density changes due to an environmental factor such as the temperature, humidity, or the like of the air, the density stabilized after an image is output by the printer can have a linear relationship with the density of an original image, and good gradation characteristics can be obtained. When the above-mentioned control is periodically performed, an image with high gradation characteristics and a good color balance can be formed over a long period of time.

<Sixth Embodiment>

The sixth embodiment according to the present invention will be described below.

In a printer apparatus or the like, the tendency of a change in output image density also varies depending on its fixing condition. For example, as the fixing temperature is higher, the change width of the output image density becomes larger.

The degree of change in density of an output image is not negligible in especially an output apparatus which is required to have strict density gradation characteristics.

The sixth embodiment has as its object to remove a distortion of a change in density of an output image occurring depending on the fixing condition.

Figure 19:
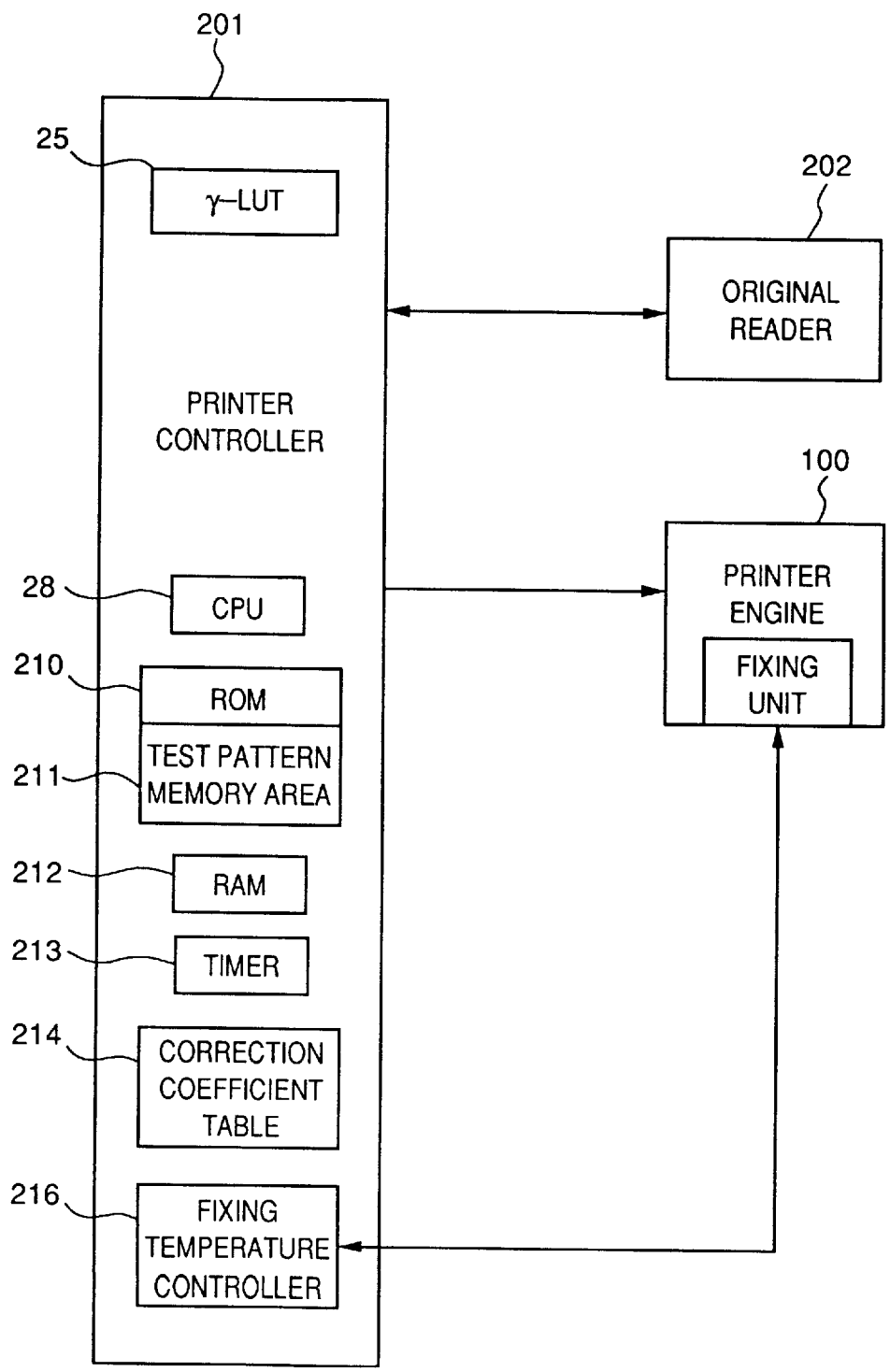
FIG. 19 is a schematic block diagram showing the arrangement of the sixth embodiment according to the present invention.

FIG. 19 is a schematic block diagram showing the arrangement of a printer apparatus according to the sixth embodiment. The same reference numerals in FIG. 19 denote the same parts as in the block diagram of FIG. 12 in the fourth embodiment, and a detailed description thereof will be omitted.

The difference from the above-mentioned fourth embodiment is that a fixing temperature controller 216 is provided to the printer controller 201.

The fixing temperature controller 216 controls the fixing temperature, and drives a fixing unit 1201 included in the printer engine 100 to attain a fixing temperature pre-set in the RAM 212.

Note that the fixing temperature set in the RAM 212 can be changed depending on the types of recording media. For example, when the recording medium is a thin sheet of 80 $g/m^2$, a fixing temperature of 160° C. is set as an optimal fixing temperature; when the recording medium is a thick sheet of 125 $g/m^2$, a fixing temperature of 180° C. is set as an optimal fixing temperature.

Figure 20:
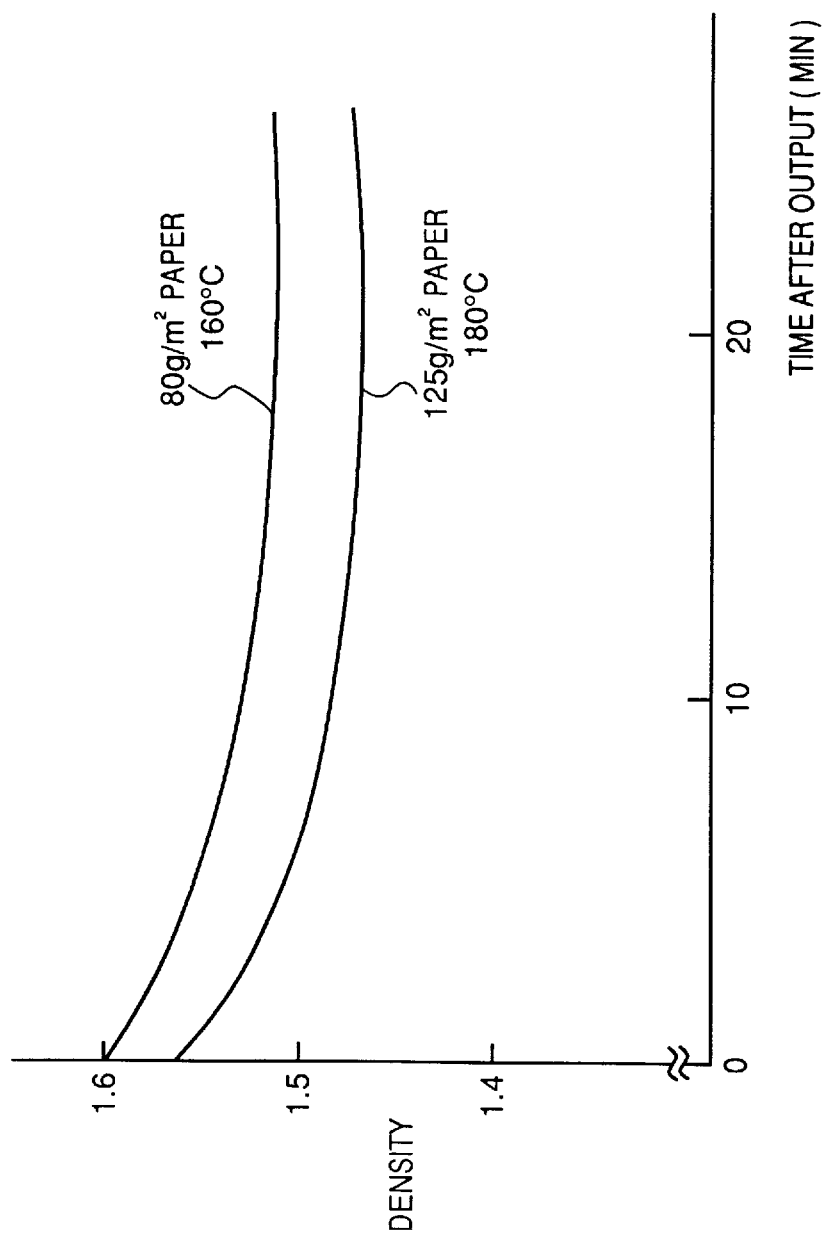
FIG. 20 is a graph showing the relationship between the time elapsed after a gradation test pattern is output and the image density of the gradation test pattern when the fixing temperature is 160° C. and 180° C. in the sixth embodiment.

FIG. 20 shows the above-mentioned relationship among the output image density, the elapsed time after the output, the types of recording media, and the fixing temperature in association with density signal level "255".

As shown in FIG. 20, in the case of a thick sheet of 125 $g/m^2$, the image density is slightly lower than that of a thin sheet of 80 $g/m^2$ from a timing immediately after the output, and in an early stage after the output (e.g., about 10 minutes), the change amount of the image density is large.

Figure 21:
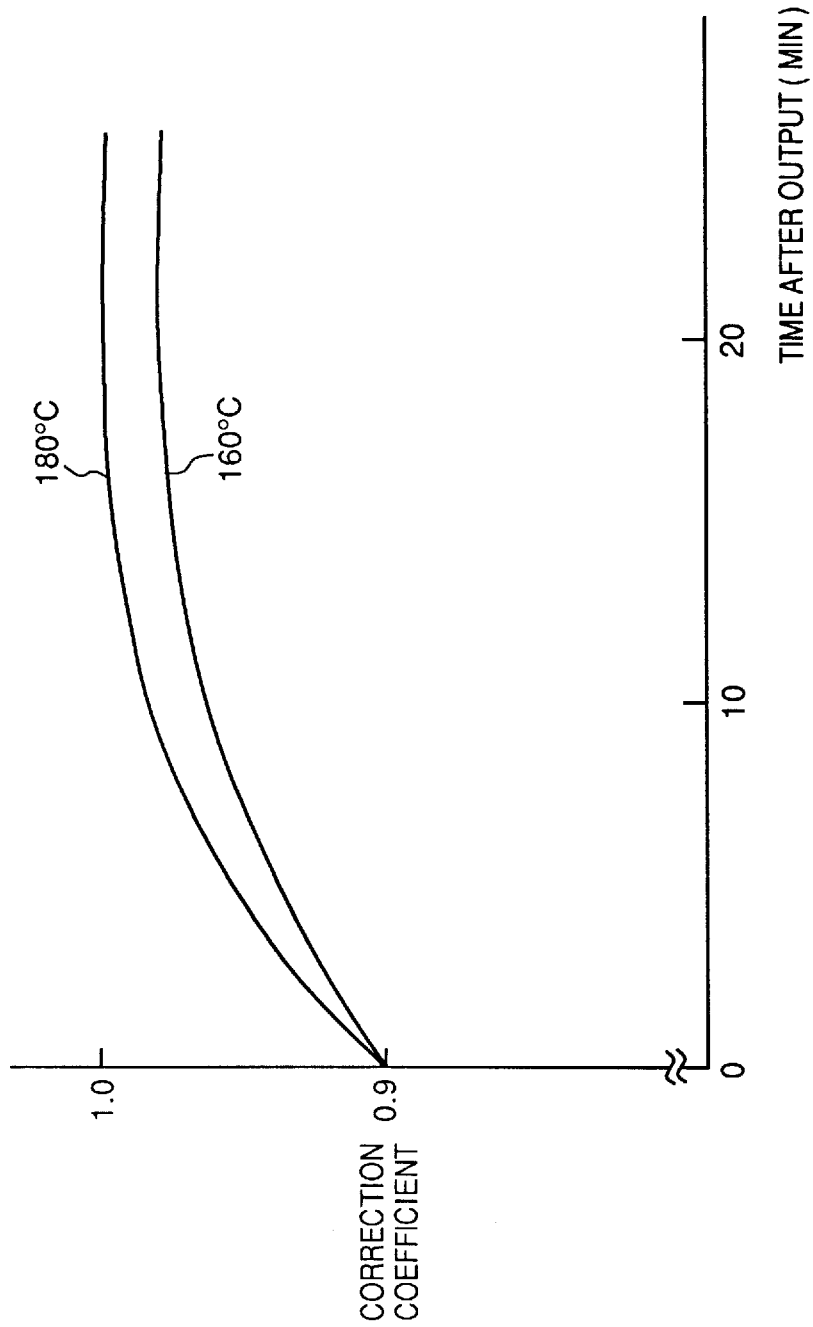
FIG. 21 is a graph showing the relationship between the time elapsed after a gradation test pattern is output and the correction coefficient when the fixing temperature is 160° C. and 180° C. in the sixth embodiment.

The relationship among the elapsed time after the output, the correction coefficient, and the fixing temperature is determined on the basis of the characteristics shown in FIG. 20, as shown in FIG. 21, and is set in the correction coefficient table 214. In this case, correction coefficient data when the fixing temperature is, e.g., 160° C. and 180° C., are set in the correction coefficient table 214, and correction at an intermediate temperature is performed by interpolation.

With the above-mentioned arrangement, an image density read by the original reader 202 is multiplied with a correction coefficient obtained from the correction coefficient table 214 in correspondence with the fixing temperature pre-set in the RAM 212 by the fixing temperature controller 216 and the time elapsed after the image is read, thereby correcting the density.

Thereafter, a γ-LUT 25 is re-generated as in the fourth embodiment.

In the sixth embodiment, as the fixing condition, the fixing temperature and the thickness of the recording medium are used. However, the present invention is not limited to this. For example, the density change characteristics change due to a change in coating amount of silicone oil, the rotational speed of the fixing rollers, the types of recording media, and the like. Therefore, when the correction coefficients are set in correspondence with the density change characteristics in consideration of these parameters, an image with better gradation characteristics can be output.

As described above, in the sixth embodiment, even when the output image density changes depending on the fixing condition, the density stabilized after an image is output by the printer can have a linear relationship with the density of an original image, and good gradation characteristics can be obtained. When the above-mentioned control is periodically performed, an image with high gradation characteristics and a good color balance can be formed over a long period of time.

As described above, according to the fourth to sixth embodiments, since the correction amount upon formation of an image is changed in correspondence with the time from when a gradation test pattern is formed until the pattern is read, an image with high gradation characteristics can be formed.

When gradation correction using a gradation test pattern is periodically performed, an image with high gradation characteristics and a good color balance can be formed over a long period of time.

<Seventh Embodiment>

Figure 22:
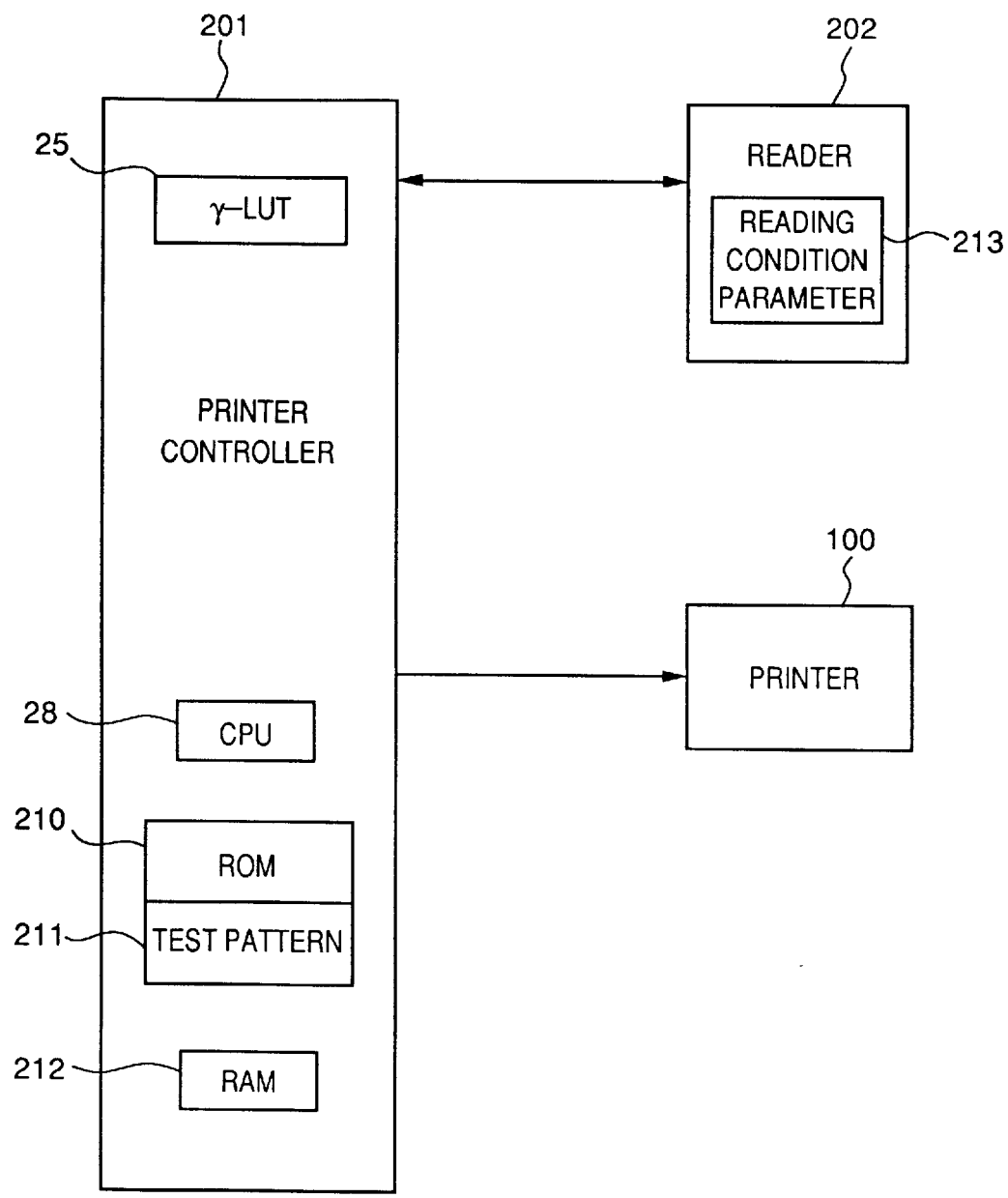
FIG. 22 is a schematic block diagram showing the arrangement of a color copying machine according to the seventh embodiment of the present invention.

The seventh embodiment according to the present invention will be described in detail below with reference to the accompanying drawings. FIG. 22 is a schematic block diagram showing the arrangement of a color copying machine according to the seventh embodiment of the present invention. Referring to FIG. 22, reference numeral 201 denotes a printer controller for controlling the entire color copying machine. The printer controller 201 comprises a CPU 28 such as a microprocessor, a ROM 210 for storing control programs for the CPU 28 and various data, a RAM 212 used as a work area of the CPU 28, and the like. The ROM 210 includes a test pattern memory area 211 which stores test pattern data (to be described later).

Reference numeral 202 denotes an original reader, which comprises a CCD line sensor 21 and the like (to be described later). The original reader 202 reads an original image, and outputs the read image signal to the printer controller 201. In the reader 202, reading condition parameters 213 can be set in units of apparatuses. An image signal from the CCD line sensor 21 is corrected using a γ-LUT 25 (to be described later), and the corrected signal is output to a printer 100. The printer 100 comprises a laser beam printer, as shown in, e.g., FIG. 23.

Figure 23:
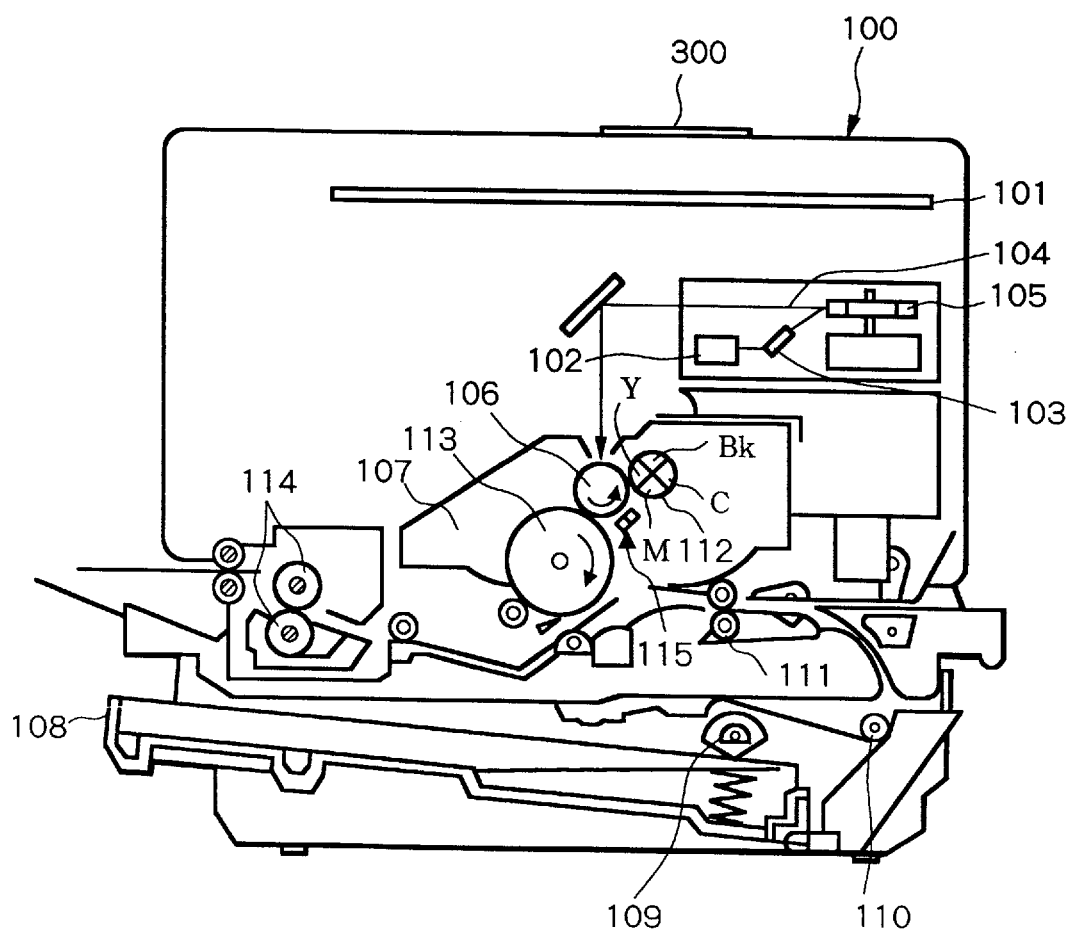
FIG. 23 is a sectional view showing the arrangement of a printer 100 shown in FIG. 22.

FIG. 23 is a sectional view showing the internal structure of a laser beam printer (LBP) constituting the printer 100 of the color copying machine of this embodiment. The printer 100 forms an image on a recording sheet on the basis of an image signal from the original reader 202.

Referring to FIG. 23, reference numeral 100 denotes a printer main body which forms an image on a recording sheet as a recording medium in accordance with an image signal input from the printer controller 201. Reference numeral 300 denotes an operation panel constituted by various switches, LED indicators, and the like. Reference numeral 101 denotes a printer control unit for controlling the entire printer 100, and analyzing character information and the like supplied from a host computer (not shown). The printer control unit 101 converts an image signal into a driving signal for a semiconductor laser, and outputs the converted signal to a laser driver 102.

The laser driver 102 is a circuit for driving a semiconductor laser 103, and turns on/off the semiconductor laser in accordance with an input video signal. A laser beam 104 is deflected in the right-and-left (main-scanning) direction by a rotary polygonal mirror 105, and scans the surface of a photosensitive drum 106. Upon scanning of the laser beam 104, a latent image is formed on the photosensitive drum 106, and the photosensitive drum 106 is rotated in the direction of an arrow in FIG. 23, thus developing the latent image in units of colors using a rotary developer 112 (FIG. 23 shows a developing state using a yellow toner).

On the other hand, a recording sheet is wound around a transfer drum 113, and four color toner images, which are developed by the rotary developer 112 in the order of Y (yellow), M (magenta), C (cyan), and Bk (black), are transferred onto the recording sheet by a total of four revolutions of the transfer drum 113, thus ending color recording. Upon completion of the color transfer, the recording sheet is separated from the transfer drum 113, and the color image on the recording sheet is fixed by a pair of fixing rollers 114, thus completing a color image print. A cut sheet is used as the recording sheet, and cut recording sheets are stored in a paper cassette 108 attached to the printer 100. Each recording sheet is fed into the apparatus by a pick-up roller 109 and feed rollers 110 and 111, and is supplied to the photosensitive drum 106.

Figure 24:
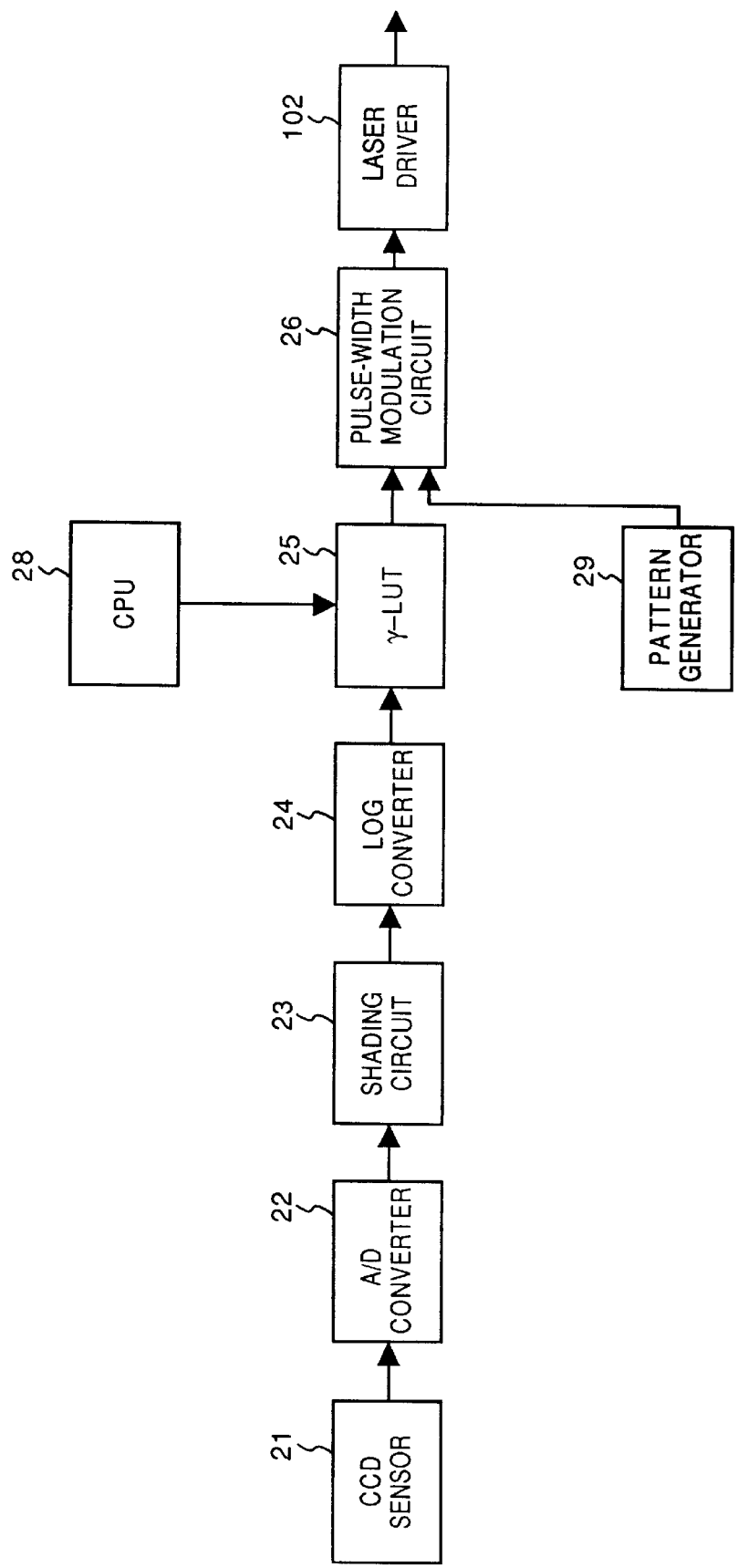
FIG. 24 is a block diagram showing a processing circuit for processing an electrical signal from a CCD.

FIG. 24 is a block diagram showing the arrangement of an image signal processing circuit for obtaining a gradation image in the copying machine of this embodiment. The circuit shown in FIG. 24 is arranged in the printer controller 201.

When a luminance signal of an original image read by the CCD line sensor in the reader 202 is output, the luminance signal is converted into a digital luminance signal by an A/D converter 22. The digital luminance signal is supplied to a shading circuit 23, which corrects light amount nonuniformity caused by a sensitivity variation of sensor elements in the CCD line sensor 21, and is subjected to shading-correction. The corrected luminance signal is LOG-converted by a LOG converter 24, and is converted using the gamma look-up table (γ-LUT) 25, so that the original image density in the initial state coincides with the output image density processed in correspondence with the γ characteristics of the printer 100. The converted image signal is converted into a pulse-width modulated signal by a pulse width modulation circuit 26, and the modulated signal is input to the laser driver 102, thus driving the semiconductor laser 103. Reference numeral 29 denotes a pattern generator for generating various gradation patterns shown in FIG. 7.

In this embodiment, an electrostatic latent image having gradation characteristics based on a change in dot area is formed on the photosensitive drum 106 upon scanning of a laser beam using gradation reproduction means based on pulse-width conversion processing with which pixels of all Y, M, C, and Bk colors are aligned in the sub-scanning direction, and a gradation image is obtained on a recording sheet via developing, transfer, and fixing processes.

The γ-LUT 25 is generated based on the arithmetic operation result to be described below.

Figure 25:
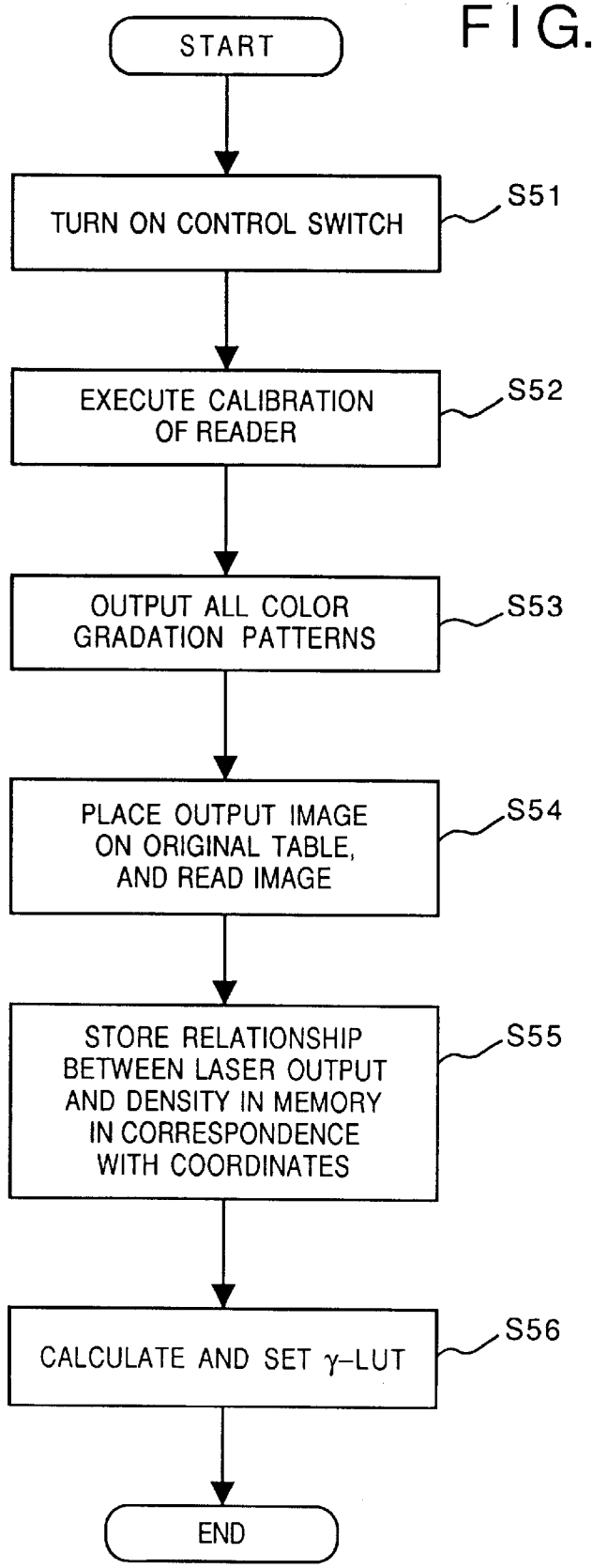
FIG. 25 is a flow chart showing γ-LUT updating processing in the seventh embodiment.

FIG. 25 is a flow chart showing processing for generating the γ-LUT 25.

Upon depression of a control switch for starting generation of a γ-LUT (step S51), calibration of the reader 202 is performed (step S52).

The calibration of the reader 202 will be described in detail below.

Figure 26:
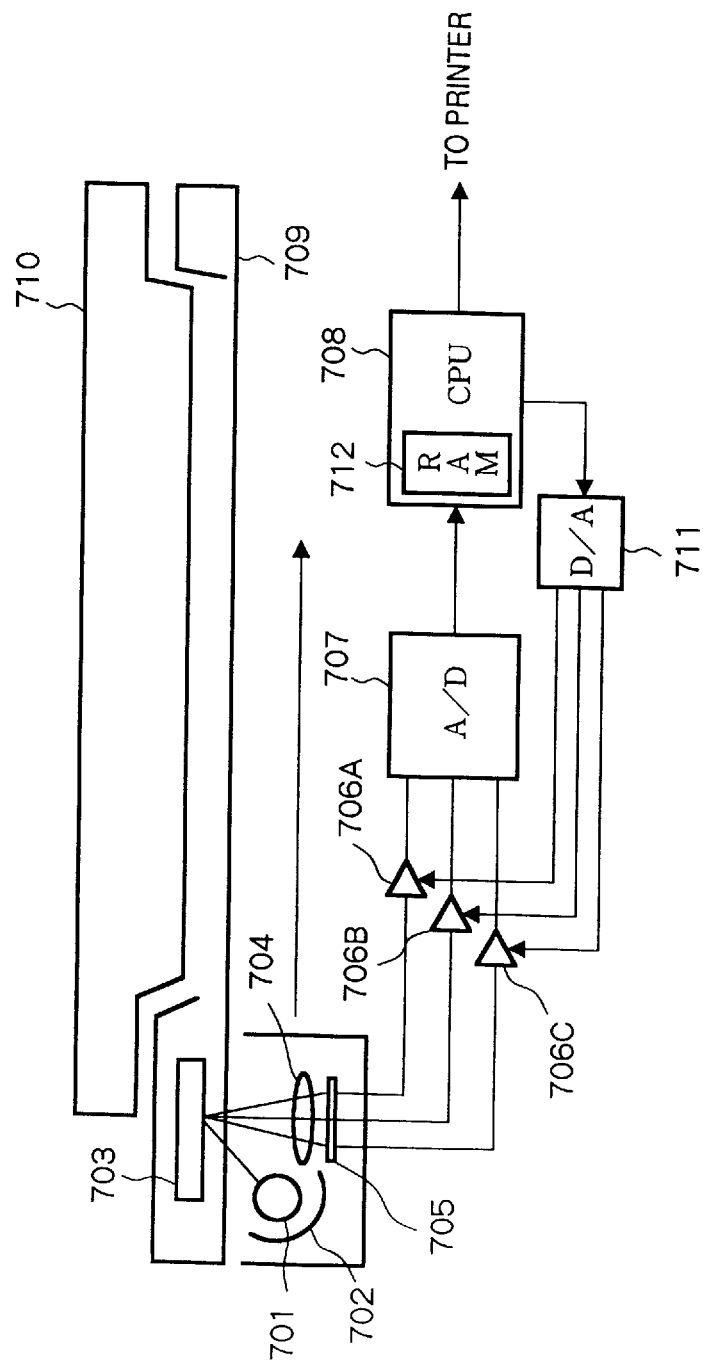
FIG. 26 is a schematic diagram showing the arrangement of a reader 202.
Figure 27:
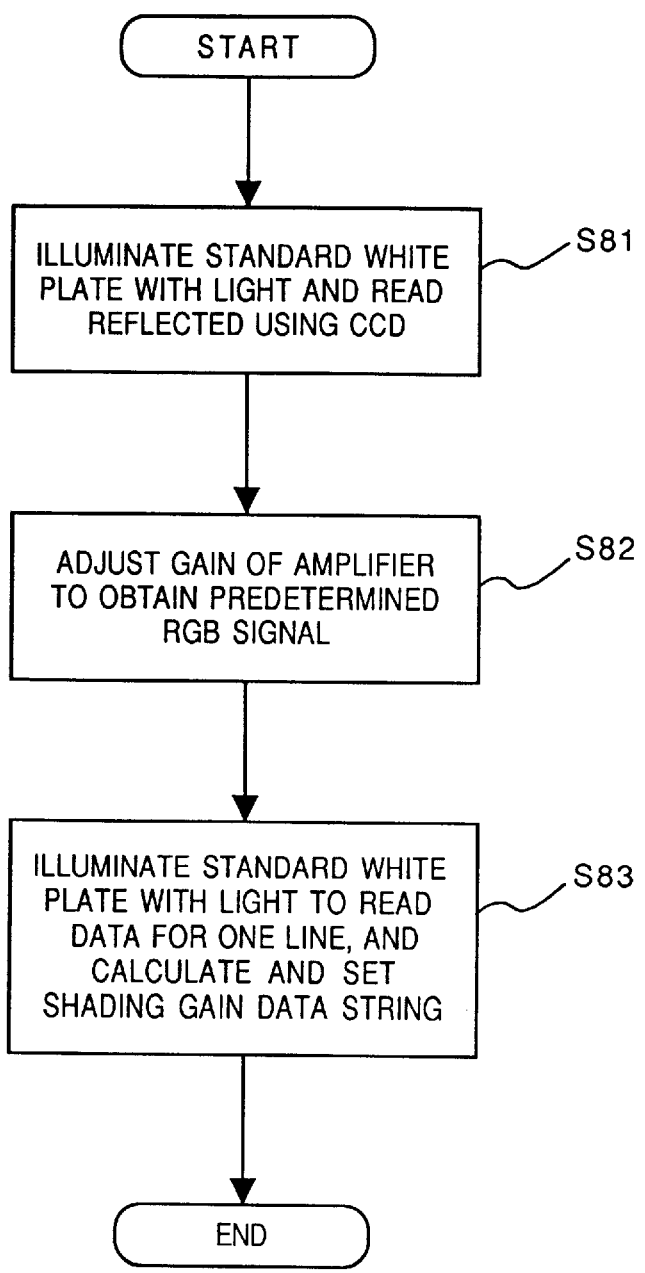
FIG. 27 is a flow chart showing a calibration operation of the reader 202.

FIG. 26 is a diagram showing the arrangement of the reader 202, and FIG. 27 is a flow chart showing the operation of the reader 202.

Upon execution of calibration, a standard white plate 703 which covers up to the thrust direction of a CCD sensor chip 705 is illuminated with light using a light source 701 and a reflection mirror 702, and light reflected by the plate 703 is focused on the RGB 3-line CCD sensor chip 705 including color-separation filters by an optical system 704 (step S81).

In this case, assume that Red, Green, and Blue signal values at predetermined positions on the standard white plate 703 upon reading of these signals are known.

Signals generated based on light focused on the 3-line CCD sensor chip 705 are amplified by operational amplifiers 706A to 706C, and the amplified signals are converted into a digital signal by an A/D converter 707. The digital signal is supplied to a CPU 708.

When the CPU 708 determines that the R, G, and B signals at the predetermined positions on the standard white plate 703 are different from target values, the CPU 708 adjusts the gains of the operational amplifiers 706A to 706C via a D/A converter 711 to obtain target signals (step S82).

The standard white plate 703 is illuminated with light again to acquire signals for one line of the CCD sensor chip 705.

Figure 28:
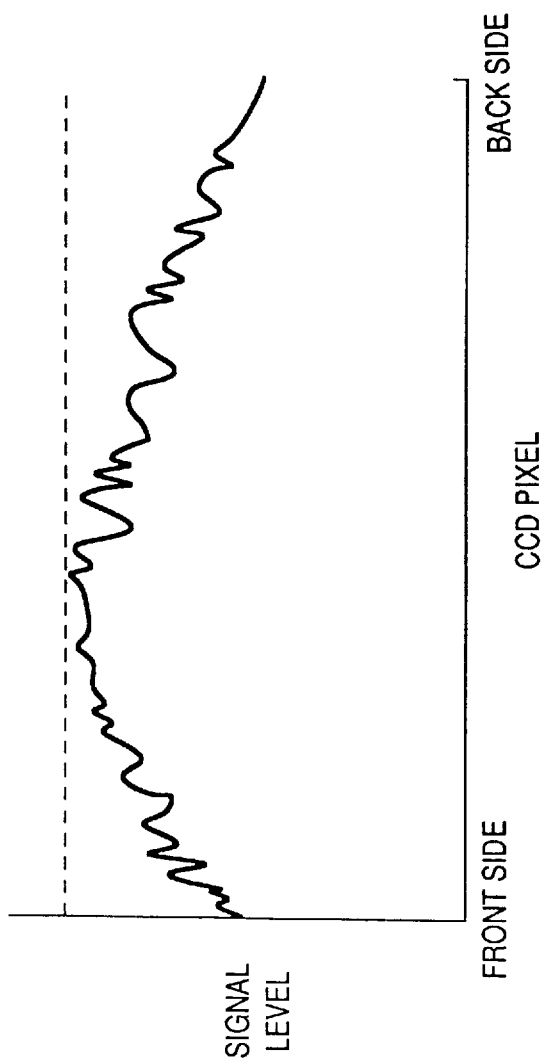
FIG. 28 is a graph showing the signal level of a CCD pixel.

In FIG. 28, a pixel array of the CCD sensor chip 705 is plotted along the abscissa, and the signal level is plotted along the ordinate. As shown in FIG. 28, the signal level of a CCD output obtained when no correction is performed varies in units of pixels of the CCD sensor, as indicated by a solid curve.

Thus, the gains are adjusted in units of pixels of the CCD sensor chip 705 in a software manner to perform shading of the signal level, as indicated by a broken line in FIG. 28. The shading gain string is calculated, and is registered in a RAM 712 in the CPU 708 (step S83). Thereafter, when an image signal is input, it is multiplied with the registered shading gains in units of pixels, thus compensating the image signal.

The above-mentioned operation is the calibration of the reader 202.

Then, a gradation pattern including all color patterns shown in FIG. 7 is output in accordance with data in the test pattern memory area 211 registered in the ROM 210 of the printer controller 201. This pattern is output without using the previous γ-LUT 25 (step S53).

The output gradation pattern is placed on an original table of the reader, and is illuminated with light emitted from a light source. The light reflected by the gradation pattern is converted into a reflected light amount signal by the CCD line sensor 21 via a color-separation optical system, and the obtained light amount signal is converted from luminance information into density information by the LOG converter 24, thus obtaining a density signal (step S54).

The relationship between the laser output level and the read and corrected density value is fetched in a memory for the respective reading coordinate positions on the gradation pattern (step S55).

The printer characteristics shown in the third quadrant in FIG. 4 are calculated on the basis of this relationship. By reversing the input/output relationship of the printer characteristics, a γ-LUT 25 of this printer is determined, thereby setting the γ-LUT 25 (step S56).

Upon calculation of the γ-LUT 25, since only data corresponding to the number of gradation patterns included in the gradation test pattern are available, intermediate short data must be generated by data interpolation so as to determine correspondences between all density signal levels "0" to "255" and the laser output levels.

Upon completion of the above-mentioned control, a message "ready to copy" is displayed on the operation panel, and thereafter, the apparatus is set in a copy standby state.

In a copy operation mode, when the γ-LUT 25 calculated by the above-mentioned method is set, the gradation characteristics in which the density stabilized after an image is output has a linear relationship with a laser output signal can be obtained.

When the above-mentioned control is periodically performed, an image with high gradation characteristics and a good color balance can be formed over a long period of time.

As described above, according to this embodiment, the reading condition is controlled in correspondence with a change in reading condition in image reading means, and the image forming condition is adjusted on the basis of proper reading information, thus forming an image with good gradation characteristics.

<Eighth Embodiment>

A preferred embodiment according to the present invention will be described in detail below with reference to the accompanying drawings.

The arrangement of a color copying machine in this embodiment and the arrangement of an image signal processing circuit for obtaining a gradation image are respectively the same as those shown in FIGS. 2 and 3.

Processing in the eighth embodiment will be described below with reference to the flow chart shown in FIG. 29.

Figure 30:
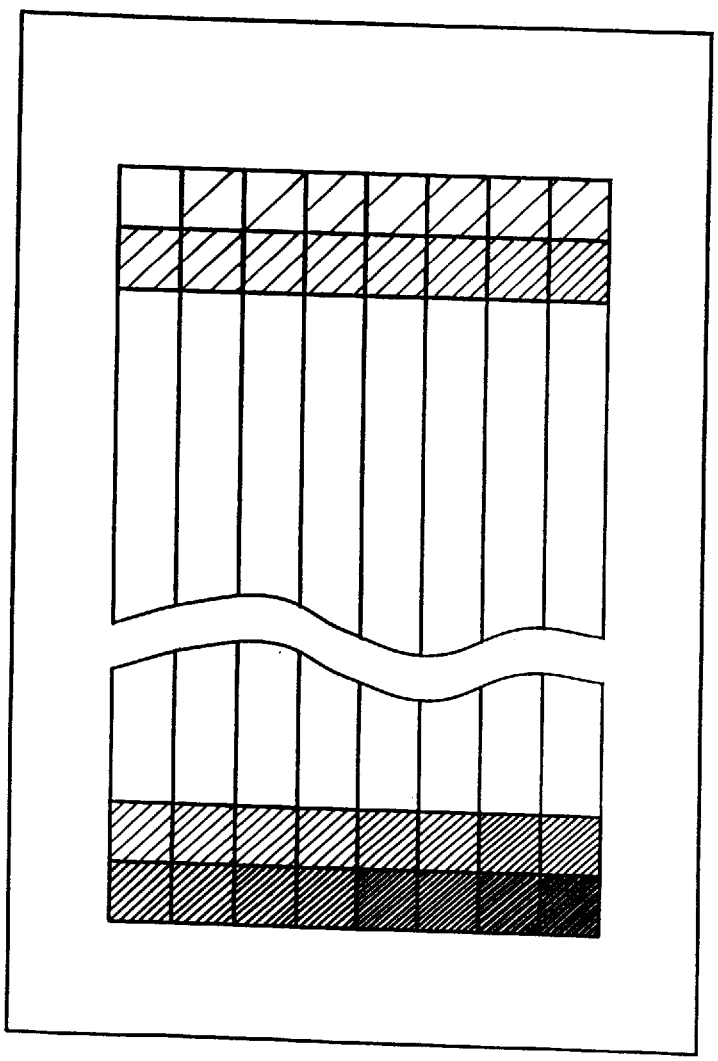
FIG. 30 is a view showing a print output example in the eighth embodiment.

When a control start switch is depressed on the operation panel 300 in step S11 while designating a color which is determined to have abnormal gradation characteristics, the flow advances to step S12. In step S12, the internal pattern generator 29 forms a 256-gradation pattern image of the designated color on a recording medium, as shown in FIG. 30, and the pattern is printed out. At this time, in order to prevent a reading error of the pattern, the size of a patch pattern is limited as follows.

Assume that a shift amount a shifted in a print-out operation is 2 mm, a shift amount b shifted in a reading operation of the reader is 0.5 mm, a shift amount c between a recording medium and an original table is 2 mm, and a radius d of a patch reading range is 1.5 mm. The amounts a, b, and d are values inherent to this apparatus, and the amount c is an artificial one. If the radius of the patch pattern is represented by x, the radius x is set to satisfy $x \leq a+b+c+d=6$ mm.

Thus, even when the patch pattern is shifted in a print-out operation, a placing operation on the original table, or a reading operation, the shift amount can be absorbed, and the patch pattern can be reliably read.

In step S13, when a printed-out sample 101 is placed on an original table of the reader, it is illuminated with light emitted from a light source 303, and light reflected by the sample is read after being converted into a reflected light amount signal by a CCD 105 via a color-separation optical system 104. In step S14, the read signal is LOG-converted in accordance with the above-mentioned image processing shown in FIG. 3, and the converted signal is then converted into density data. It is generally known that an optical system using a CCD can have good measurement reproducibility upon execution of shading correction. In step S16, an LUT is calculated and set using the 256-gradation density data. In order to improve the gradation characteristics, for example, a laser light amount, laser emission time, primary charger voltage, developing bias, or the like may be adjusted.

With the above-mentioned control, even when the position of a gradation pattern is shifted during a print-out or reading operation, a reading error of density data can be prevented, and an image with good gradation characteristics can be formed.

<Modification of Eighth Embodiment>

In the above-mentioned embodiment, the size of each gradation pattern is uniform. Alternatively, a reference point may be recorded on a recording medium, and the sizes of patches farther from the reference point may be larger.

Figure 31:
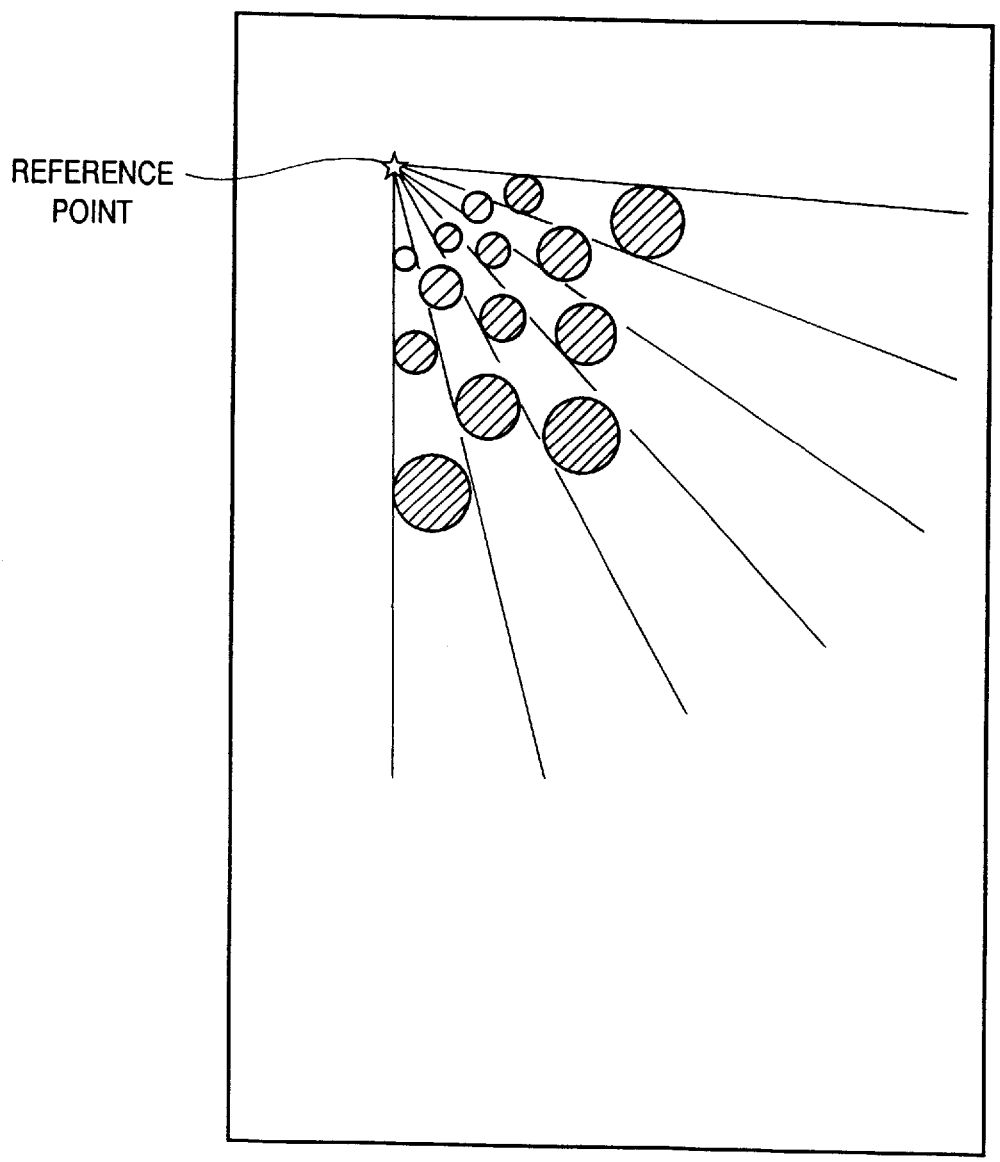
FIG. 31 is a view showing a print output example in a modification of the eighth embodiment.

In this case, as shown in FIG. 31, a reference point and a 256-gradation pattern image of a designated color are formed on a recording medium, and are printed out. At this time, patches closer to the reference point have smaller pattern image sizes since shifts are small, and the pattern image sizes increase as their positions are separated farther from the reference point.

Thus, when a gradation pattern is read, the densities of the patches are obtained on the basis of the reference point, thus preventing a reading error of the density data and allowing formation of an image with good gradation characteristics, as in the eighth embodiment.

<Ninth Embodiment>

In the above-mentioned embodiment, control is made based on a designated single color. However, since mismatching of conversion tables due to aging occurs for all the color toners to be used, as a matter of course, correction is performed for all the colors, i.e., yellow, magenta, cyan, and black at one time in the ninth embodiment.

Figure 32:
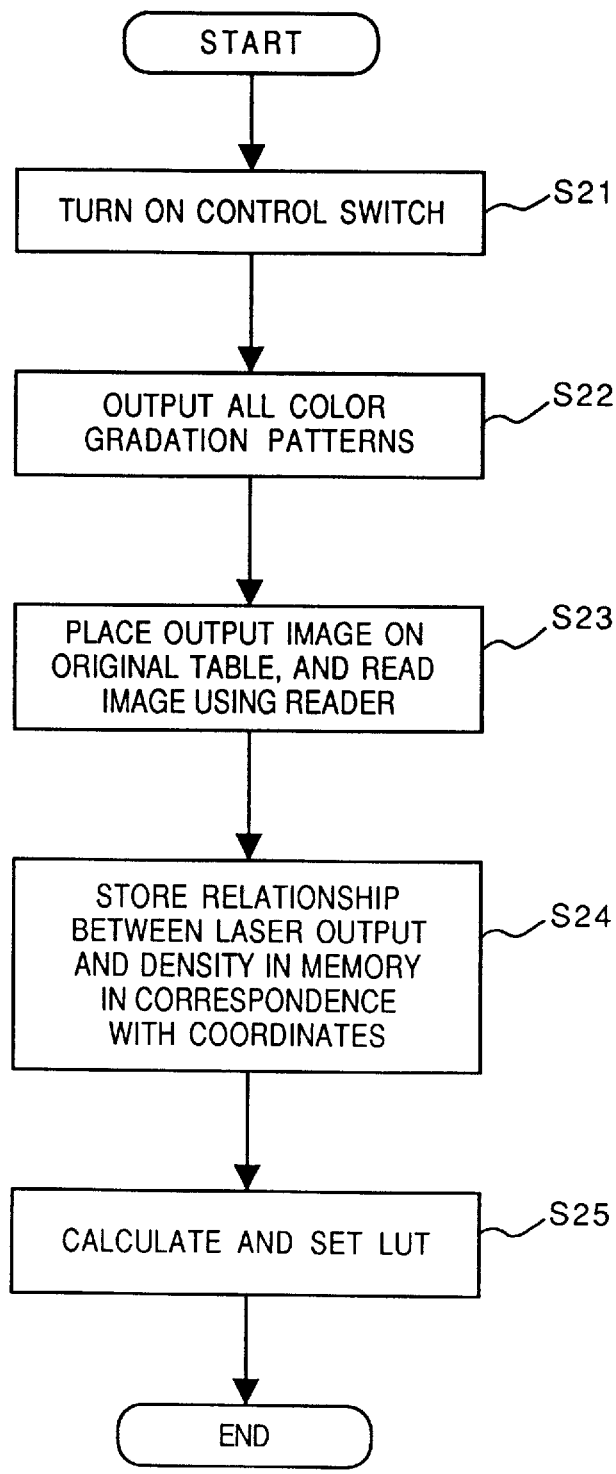
FIG. 32 is a flow chart showing processing according to the ninth embodiment of the present invention.

FIG. 32 is a flow chart showing the processing in the ninth embodiment.

Figure 33:
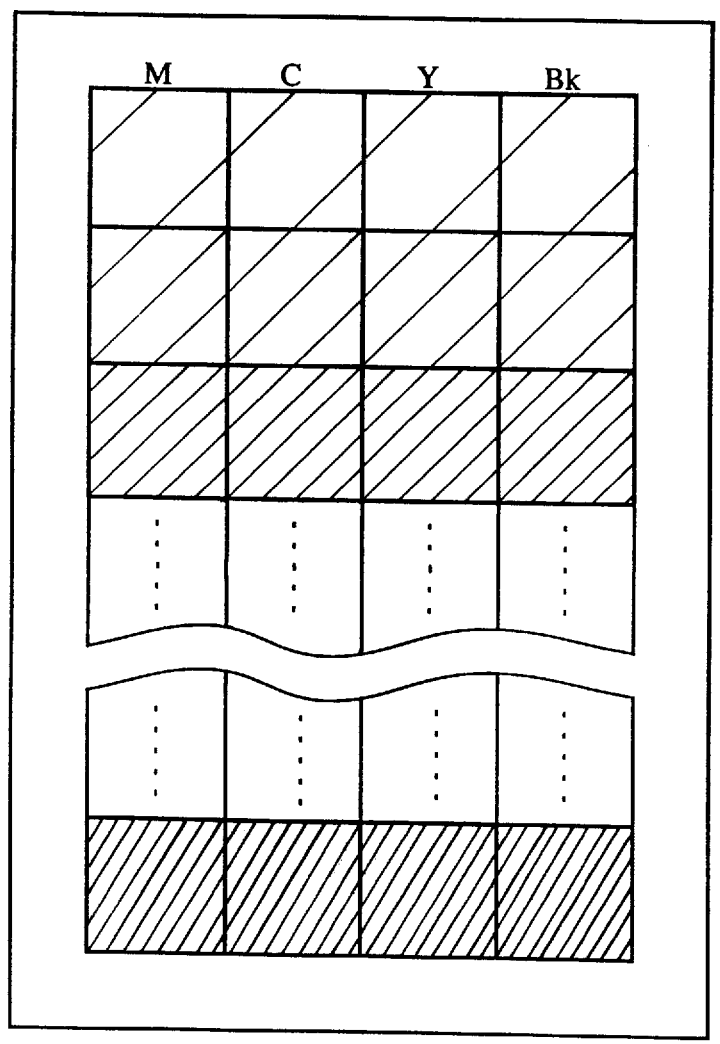
FIG. 33 is a view showing a print output example in the ninth embodiment.

When a control start switch on an operation panel is depressed in step S21, the flow advances to step S22. In step S22, the internal pattern generator 29 forms a pattern image including 16-gradation patterns of all the colors, as shown in FIG. 33, on a recording medium, and the image is printed out, as in the above embodiment.

When the printed-out pattern is placed on an original table of the reader, the pattern image is read in step S23. Then, the read image signal is LOG-converted in accordance with the above-mentioned image processing shown in FIG. 3, and is then converted into density data in step S24 as in the above-mentioned embodiment. In step S25, an LUT is calculated and set using the density data.

Upon generation of the LUT, in order to generate intermediate data based on 16-point data, linear interpolation is performed. However, in order to improve accuracy, it is preferable to perform higher-order interpolation or approximation.

With the above-mentioned control, even when a recording medium is not accurately placed on the original table, a reading error of density data can be prevented, and an image with good gradation characteristics can be formed.

As described above, according to this embodiment, since a pattern is formed and read in consideration of a shift, the image forming condition can be reliably adjusted, and an optimal image can be obtained.

<Modification>

In each of the above-mentioned embodiments, a full-color digital copying machine has been exemplified. However, the present invention is also effective for a monochrome digital copying machine.

Figure 34:
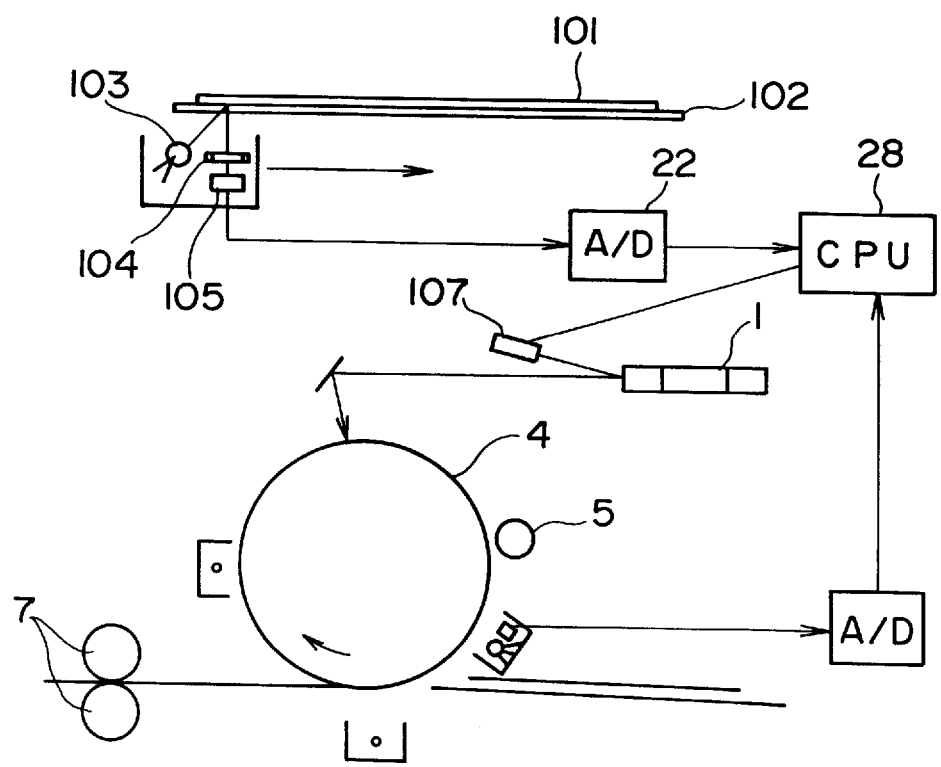
FIG. 34 is a schematic diagram showing the arrangement of a monochrome digital copying machine in a modification of the ninth embodiment.

FIG. 34 shows the arrangement of a monochrome digital copying machine. Note that reference numerals of principal components in FIG. 34 are common to those in FIG. 2.

A large difference from a color copying machine is that the transfer drum is omitted since the monochrome copying machine does not require multiple transfer operations.

Figure 29:
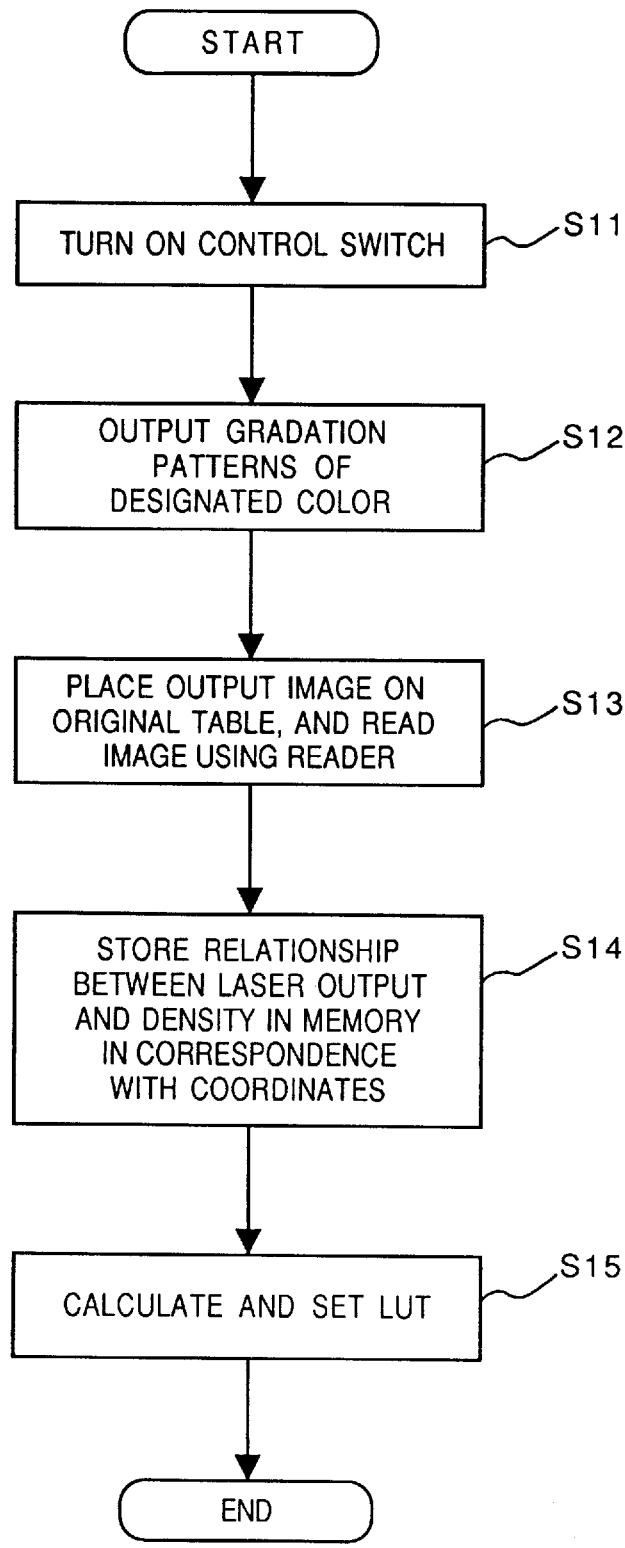
FIG. 29 is a flow chart showing processing according to the eighth embodiment of the present invention.

The control itself is the same as that shown in FIGS. 29 and 30, and a detailed description thereof will be omitted.

Upon execution of the same control as in the above embodiment, even when a recording medium is not accurately placed on the original table, a reading error of density data can be prevented, and an image with good gradation characteristics can be formed.

Note that the present invention can be applied to either a system constituted by a plurality of devices or an apparatus consisting of a single device. Also, the present invention can be applied to a case wherein the invention is achieved by supplying a program to the system or apparatus.

In each of the above-mentioned embodiments, density correction processing is executed for image data so as to adjust the image forming condition of an image forming apparatus. However, the present invention is not limited to correction for image data. For example, in the case of the above-mentioned electrophotography system, a process amount such as the voltage to be applied to a photosensitive drum or a developer may be controlled.

The time measurement of the timer 213 need only be started after image formation is almost completed. For example, the time measurement may be started when a recording medium passes the fixing device or an output image is actually discharged from the image forming apparatus.

An effective reading period of a reference image based on a pattern signal from the pattern generator 29 from an image output timing is not limited to the above-mentioned period, but may be arbitrarily determined in correspondence with the characteristics of the image forming apparatus.

The present invention is not limited to the above-mentioned embodiments, and various modifications and applications may be made within the scope of the claims.

In particular, a combination of the concepts of the above-mentioned embodiments is included in the scope of the invention.

What is claimed is:

1. An image processing apparatus comprising:
   generating means for generating a test pattern signal;
   image forming means for forming a test image with recording materials on a medium in accordance with the test pattern signal;
   reading means for reading the test image formed on the medium by said image forming means, and generating image data, the medium being transported to the reading means by an operator;
   counting means for counting a time after an image forming of the test image with the recording materials;
   adjusting means for adjusting an image forming condition of said image forming means based on the image data generated by said reading means; and
   controlling means for controlling an adjusting operation in accordance with the time after the forming of the test image.

2. The apparatus according to claim 1, further comprising:
   display means for displaying the time counted by said counting means.

3. The apparatus according to claim 1, wherein said controlling means executes the adjusting operation after the time counted by said counting means becomes a value not less than a predetermined value.

4. The apparatus according to claim 3, wherein said controlling means causes said reading means to read the image on the medium after the time counted by said counting means becomes a value not less than the predetermined value.

5. The apparatus according to claim 1, wherein said controlling means interrupts the adjusting operation when the time counted by said counting means becomes a value not less than a predetermined value.

6. The apparatus according to claim 5, further comprising:
   display means for, when the adjusting operation is interrupted, displaying a message indicating this state.

7. The apparatus according to claim 1, wherein said controlling means controls the adjusting by said adjusting means in accordance with the time counted by said counting means.

8. The apparatus according to claim 1, further comprising:
   detection means for detecting an operation environment of said image forming means, and
   wherein said controlling means controls the adjusting operation in accordance with a detection result of said detection means.

9. The apparatus according to claim 8, wherein said detection means detects at least one of a temperature, a humidity, and a type of recording medium.

10. An image forming method comprising the steps of:
    generating a test pattern signal;
    forming a test image with recording materials on a medium, in accordance with the test pattern signal, by an image forming means;
    counting a time after an image forming of the test image with the recording materials;
    reading the test image formed on the medium by the image forming means with reading means and generating image data, the medium being transported to the reading means by an operator;
    adjusting an image forming condition of the image forming means based on the image data; and
    controlling an adjusting operation in accordance with the time after the forming of the test image.

11. The method according to claim 10, further comprising the step of:
    displaying the time counted in the counting step.

12. The method according to claim 10, wherein, in the controlling step, the adjusting operation is executed after the time counted in the counting step becomes a value not less than a predetermined value.

13. The method according to claim 12, wherein, in the controlling step, the image on the medium is read in the reading step after the time counted in the counting step becomes a value not less than the predetermined value.

14. The method according to claim 10, wherein, in the controlling step, the adjusting operation is interrupted when the time counted in the counting step becomes a value not less than a predetermined value.

15. The method according to claim 14, further comprising the step of:
    displaying a message indicating that the adjusting operation is interrupted upon interruption of the adjusting operation.

16. The method according to claim 10, wherein, in the controlling step, the adjusting in the adjusting step is controlled in accordance with the time counted in the counting step.

17. The method according to claim 10, further comprising the step of:
    detecting an operation environment of the image forming means, and
    wherein, in the controlling step, the adjusting operation is controlled in accordance with a detection result in the detecting step.

18. The method according to claim 17, wherein, in the detecting step, at least one of a temperature, a humidity, and a type of recording medium is detected.

19. An image processing apparatus comprising:
    first reading means for reading an original and generating image data;
    generating means for generating a test pattern signal corresponding to a test image;
    image forming means for forming an image on a medium in accordance with the image data or the test pattern signal;
    second reading means for reading the test image formed by said image forming means on the medium and generating test image data; and
    adjusting means for adjusting an image forming condition of said image forming means based on the test image data which is obtained by reading the test image formed in accordance with the test pattern signal, wherein a size of the test image is determined by taking an aberration of the medium in said second reading means into account.

20. An image processing method comprising the steps of:

reading an original and generating image data;

generating a test pattern signal corresponding to a test image;

forming an image on a medium in accordance with the image data or the test pattern signal by an image forming means;

reading the test image generated in said forming step on the medium and generating test image data by a reading means; and adjusting an image forming condition of the image forming means based on the test image data which is obtained by reading the test image formed in accordance with the test pattern signal, wherein a size of the test image generated in said forming step is determined by taking an aberration of the medium in the reading means into account.

21. The apparatus according to claim 19, wherein the test image comprises a plurality of patches, each of which has a different density level.

22. The apparatus according to claim 19, wherein the test image comprises a plurality of patches, each of which has a different color.

23. The apparatus according to claim 19, wherein the size of the test image is determined by taking an area size of reading the test image into account.

24. The apparatus according to claim 19, wherein said first reading means and second reading means comprise the same image sensor.

25. The apparatus according to claim 19, wherein said image processing apparatus is a copying apparatus.

26. The method according to claim 20, wherein the test image comprises a plurality of patches, each of which has a different density level.

27. The method according to claim 20 wherein the test image comprises a plurality of patches, each of which has a different color.

28. The method according to claim 20, wherein the size of the test image is determined by taking an area size of reading the test image into account.

* * * * *

UNITED STATES PATENT AND TRADEMARK OFFICE
CERTIFICATE OF CORRECTION

PATENT NO. : 5,859,933
DATED : January 12, 1999
INVENTOR(S) : SASANUMA ET AL.

It is certified that error appears in the above-indentified patent and that said Letters Patent is hereby corrected as shown below:

On the title page: Item

[30] Foreign Application Priority Data:

Line 1, "Oct. 29, 1973" should read --Oct. 29, 1993--.

COLUMN 19:

Line 29, "$x \leq a+b+c+d=6$" should read --$x \geq a+b+c+d=6$--.

Signed and Sealed this

Tenth Day of August, 1999

Attest:

Q. TODD DICKINSON

*Attesting Officer*  *Acting Commissioner of Patents and Trademarks*